US010269116B2

(12) United States Patent
Parra et al.

(10) Patent No.: US 10,269,116 B2
(45) Date of Patent: Apr. 23, 2019

(54) PROPRIOCEPTION TRAINING METHOD AND APPARATUS

(71) Applicant: Intel Corporation, Santa Clara, CA (US)

(72) Inventors: Jeremy Parra, Beaverton, OR (US); Isaac Clayton, Tigard, OR (US); David P. Kuhns, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 117 days.

(21) Appl. No.: 15/390,688

(22) Filed: Dec. 26, 2016

(65) Prior Publication Data

US 2018/0182094 A1   Jun. 28, 2018

(51) Int. Cl.
*G06T 7/00* (2017.01)
*G06T 7/70* (2017.01)
*G06K 9/62* (2006.01)
*G06T 19/00* (2011.01)
*G06T 7/50* (2017.01)
*G06T 7/20* (2017.01)
*G06T 3/20* (2006.01)
*G06K 9/00* (2006.01)

(52) U.S. Cl.
CPC ........ *G06T 7/0012* (2013.01); *G06K 9/00342* (2013.01); *G06T 7/20* (2013.01); *G06T 7/50* (2017.01); *G06T 7/70* (2017.01); *G06T 19/006* (2013.01); *G06T 2200/28* (2013.01)

(58) Field of Classification Search
CPC ........... G06K 9/00107; G06K 9/00362; G06K 9/00375; G06K 9/00597; G06K 9/00624
See application file for complete search history.

(56) References Cited

U.S. PATENT DOCUMENTS

| 6,425,764 B1 * | 7/2002 | Lamson ................ A61M 21/00 434/236 |
| 8,568,231 B2 | 10/2013 | Solanki et al. |
| 9,412,161 B2 * | 8/2016 | Varaklis ............... A61B 5/1124 |
| 9,754,167 B1 * | 9/2017 | Holz .................. G06K 9/00671 |
| 9,867,961 B2 * | 1/2018 | Shuster ................ A61M 21/02 |
| 10,013,627 B1 * | 7/2018 | Mishra ............. G06F 17/30244 |
| 2003/0142101 A1 * | 7/2003 | Lavelle ............... G06F 12/0891 345/537 |
| 2007/0035563 A1 * | 2/2007 | Biocca .................... G06F 3/014 345/633 |

(Continued)

FOREIGN PATENT DOCUMENTS

WO   2015094112 A1   6/2015

OTHER PUBLICATIONS

Ortiz Catalan, M., "Phantom Limb Pain treatment based on Augmented/Virtual Reality, Gaming, and Myoelectric Pattern Recognition," retrieved from URL <<https://www.chalmers.se/en/projects/Pages/Phantom-limb-pain-eng.aspx, >> [retrieved on Dec. 23, 2016]], 2 pages.

(Continued)

*Primary Examiner* — Bobbak Safaipour
(74) *Attorney, Agent, or Firm* — Schwabe, Williamson & Wyatt, P.C.

(57) ABSTRACT

Methods, apparatus, and system to identify a memory contention with respect to a process, re-write the process to form a transactional process, and execute the transactional process in a speculative execution.

25 Claims, 22 Drawing Sheets

(56) References Cited

U.S. PATENT DOCUMENTS

| | | | | |
|---|---|---|---|---|
| 2008/0077196 A1* | 3/2008 | Greenberg | ........... | A61N 1/0543 607/54 |
| 2012/0128201 A1* | 5/2012 | Brickhill | ............ | G06K 9/00355 382/103 |
| 2012/0206577 A1* | 8/2012 | Guckenberger | ..... | G09B 19/003 348/47 |
| 2013/0035734 A1* | 2/2013 | Soler Fernandez | .......................... | A61N 1/36021 607/3 |
| 2014/0114119 A1* | 4/2014 | Wiest | .................... | A61M 21/02 600/27 |
| 2015/0196800 A1* | 7/2015 | Macri | ................... | A61B 5/0482 482/8 |
| 2015/0302426 A1* | 10/2015 | Rogers | ............... | G06Q 30/0201 705/7.29 |
| 2016/0263345 A1* | 9/2016 | Shuster | ................. | A61M 21/02 |
| 2017/0206691 A1* | 7/2017 | Harrises | ................... | G06T 11/60 |
| 2017/0216718 A1* | 8/2017 | Polzin | ................. | G06K 9/00342 |
| 2017/0266019 A1* | 9/2017 | Farina | .................... | B25J 9/1612 |
| 2017/0360578 A1* | 12/2017 | Shin | ...................... | G09B 23/286 |
| 2017/0365101 A1* | 12/2017 | Samec | ................. | G02B 27/017 |
| 2018/0004286 A1* | 1/2018 | Chen | .................... | G02B 27/017 |
| 2018/0047214 A1* | 2/2018 | Kamhi | ............... | G06K 9/00671 |
| 2018/0081439 A1* | 3/2018 | Daniels | ................... | G06F 1/163 |
| 2018/0082600 A1* | 3/2018 | Ortiz Catalan | .... | A61B 5/04888 |
| 2018/0096615 A1* | 4/2018 | Tanaka | ................... | H04N 7/185 |
| 2018/0101966 A1* | 4/2018 | Lee | ................. | H04N 21/23418 |
| 2018/0121728 A1* | 5/2018 | Wells | ................... | A61B 5/0002 |

OTHER PUBLICATIONS

Khotimah, W.N., et al., "Sitting to Standing and Walking Therapy for Post-Stroke Patients Using Virtual Reality System," 2015 International Conference on Information, Communication Technology and System (ICTS), pp. 145-149.

Feintuch, U., Meiner, Z., Tuchner, M., Lorber-Haddad, A.& Shiri, S. (2009). VirHab—A Virtual Reality System for Treatment of Chronic Pain and Disability. Proceedings of the Virtual Rehabilitation 2009 International Conference—IEEE, pp. 83-86.

* cited by examiner

PROPRIOCEPTION TRAINING METHOD AND APPARATUS

FIELD

The present disclosure relates to a computing device, in particular to, a computing device to provide proprioception training.

BACKGROUND

As used herein, "proprioception" means a sense of relative position of neighboring parts of the body and effort expended in movement. In humans, proprioception is provided by, for example, proprioceptors or muscle spindles (sensory receptors that detect, for example, changes in length) in skeletal striated muscles, tendons, and fibrous capsules in joints.

Nervous system injuries and disease can result in impairment of proprioception. For example, phantom limb pain can occur in amputees, which is the experience of pain which seems to come from the amputated limb; Complex Regional Pain Syndrome ("CRPS") can cause persistent pain following injury to a nerve; and stoke patients can experience impairment of motor abilities following neurological damage.

Some patients with proprioception impairments obtain benefits from "mirror box therapy." In mirror box therapy, a patient places both an affected limb and an unaffected limb in a box which contains a mirror or set of mirrors. The mirrors make it appear as though the unaffected limb is in the location of the affected limb. The patient makes "mirror symmetric" movements with both limbs. If the box and the patient's perspective are properly aligned, the patient sees the unaffected limb move in the location of the affected limb.

There is debate regarding why this therapy works for some patients. For example, there is a hypothesis that providing visual sensory feedback provides relief from "learned paralysis" as well as a hypothesis that the therapy enhances spatial coupling between the affected limb and the unaffected limb. There is less debate that some patients do, in fact, obtain therapeutic benefit from this therapy. For example, some patients report reduction of phantom pain and reduction in sensations that the affected limb is locked in a clenched and potentially painful position.

However, mirror box therapy is not convenient, as it requires that the patient have access to a mirror box or suitably configured mirror or set of mirrors and that the patient's mobility be limited or controlled during a therapeutic session.

Figure 1:
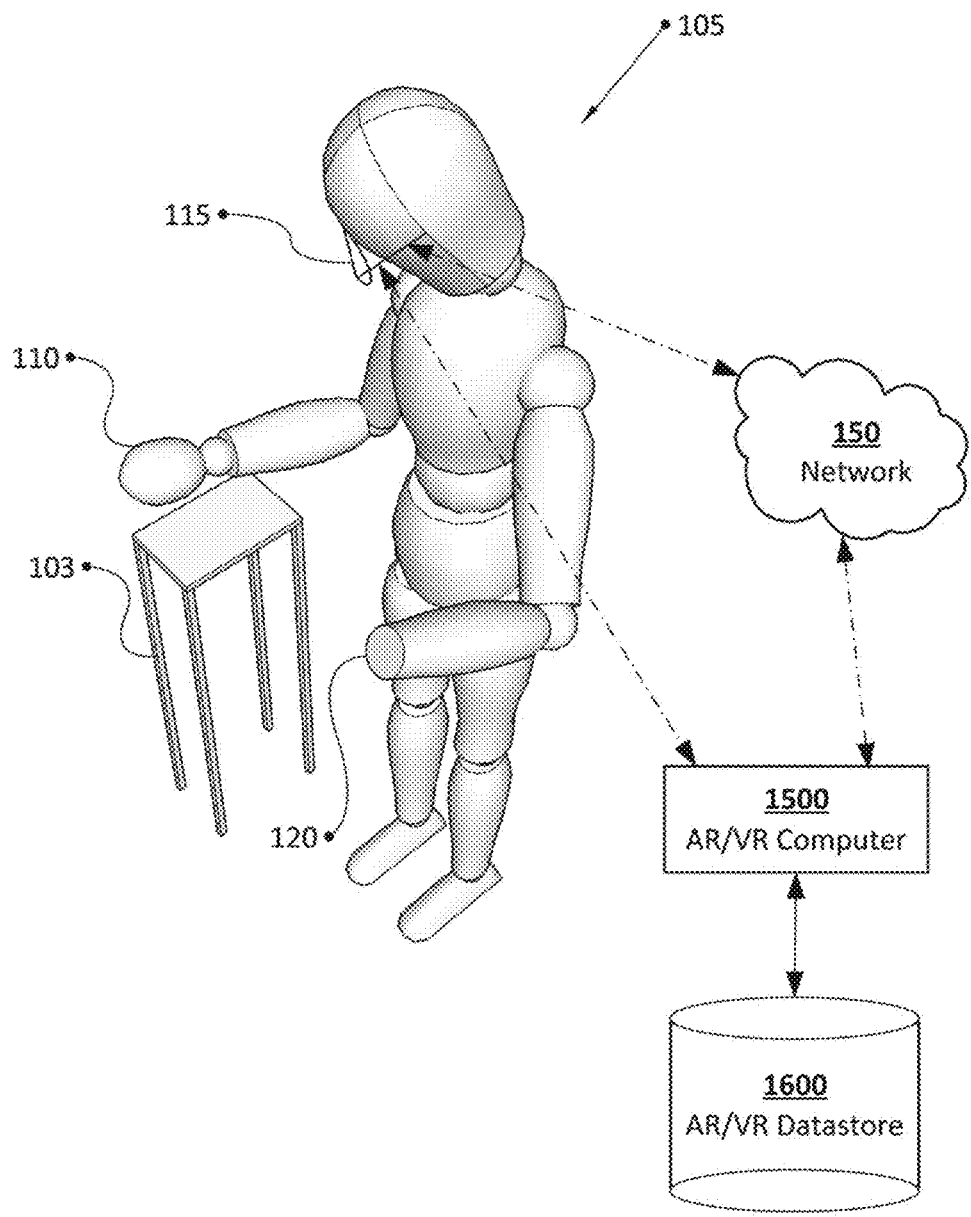
FIG. 1 is a network and device diagram illustrating an example of a human with an unimpaired human body component, an impaired human body component, with the human's attention directed to the unimpaired human body component, and an example of an output device and at least one computer device in a network environment incorporated with teachings of the present disclosure, according to some embodiments.

In reviewing the Figures, a viewer may view one entire page at a time and flip from one page to the next; this will reveal a "flip-book" effect of the drawing sheets, which is intentional. Although the following Detailed Description will proceed with reference being made to illustrative embodiments, many alternatives, modifications, and variations thereof will be apparent to those skilled in the art.

DETAILED DESCRIPTION

Following are defined terms in this document.

As used herein, the term "module" (or "logic") may refer to, be part of, or include an Application Specific Integrated Circuit (ASIC), a System on a Chip (SoC), an electronic circuit, a programmed programmable circuit (such as, Field Programmable Gate Array (FPGA)), a processor (shared, dedicated, or group) and/or memory (shared, dedicated, or group) or in another computer hardware component or device that execute one or more software or firmware programs having executable machine instructions (generated from an assembler and/or a compiler) or a combination, a combinational logic circuit, and/or other suitable components with logic that provide the described functionality. Modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

As used herein, "augmented reality" is a live direct or indirect view of a real physical environment in conjunction with or augmented by rendered computer-generated sensory output such as sound, images (whether static or in video), and/or haptic feedback. Augmented reality devices include, for example, computer devices such as smartphones, tablet computers, laptops and the like, wherein a camera (typically proximate to and/or in the computer device) obtains an image of the real world, modifies the image with a computer generated image, and outputs the modified image, such that the computer generated image appears to have or be in a physical relationship with the real world. Augmented reality devices also include head-mounted displays which project or display an image in the eye(s) of the wearer, wherein the image may appear to have or be in a physical relationship with the real world. Examples of augmented reality display devices include Google Glass® and the Hololens® by Microsoft Corporation. Augmented reality display devices may not typically occlude the wearer's entire field of view.

As used herein, "virtual reality" is an immersive simulation (e.g., a 3D environment) including at least one of images, sound, and haptic feedback. A virtual reality device is typically a head-mounted display which occludes an entire field of view of a wearer of the virtual reality display. Examples of virtual reality devices include Oculus Rift®, Google Cardboard™, Daydream™, and Samsung Gear VR®. When combined with a camera capturing real time images proximate to a wearer (such as from the normal perspective of the wearer's eyes), and wherein the real time images are output to the wearer of the device, a virtual reality display may be understood as a type of augmented reality display.

Both augmented and virtual reality may be created using interactive software and hardware and is often experienced or controlled by movement of the body and/or the output device. Both augmented and virtual reality devices may include a display or other output device and a support computer, which may be part of the output device or which may be remote from the output device. Both augmented and virtual reality output devices may include a camera (including a video camera) which records images from the normal perspective of a wearer of the device as well as audio and/or haptic output devices.

As used herein, "kinematics" is a branch of classical mechanics used to describe the motion of points and rigid bodies about or relative to joints. Kinematics describes the motion of systems of jointed parts (or multi-link systems), as are found in engines, robotic arms, and skeletons (of humans and other animals). Kinematics describes particle trajectory, including velocity and speed, acceleration, relative position vector, relative velocity, and relative acceleration, particle trajectories in cylindrical-polar coordinates, point trajectories in a body moving a plane, translation, rotation of a body around a fixed axis, point trajectories of a body moving in three dimensions ("3D"), and kinematic constraints including kinematic coupling, rolling without slipping, inextensible cords, kinematic pairs, and kinematic chains.

As used herein, a "kinematic chain" is a mathematical model of an assembly of rigid bodies (or "links") connected by joints. As used herein, "kinematic pair" is a mathematical model of a joint (or "connection") between two rigid bodies. A "kinematic diagram" is a schematic of a mechanical system that shows a kinematic chain.

As used herein, a process corresponds to an instance of a program, e.g., an application program, executing on a processor and a thread corresponds to a portion of the process. A processor may include one or more execution core(s). The processor may be configured as one or more socket(s) that may each include one or more execution core(s).

In overview, this disclosure relates to an apparatus and methods performed by and in a computer device apparatus to provide proprioception therapy. The proprioception therapy apparatus may include one or more computer devices. The proprioception therapy apparatus may include and/or communicate with an augmented or virtual reality display device (hereinafter, "output device"), wherein the proprioception therapy apparatus may obtain images from a normal perspective of the wearer of the output device.

The proprioception therapy apparatus may include a depth sensor to obtain depth information regarding the environment surrounding the wearer of the output device. The depth information may be obtained in conjunction with the images, such as a camera which obtains RGB and depth information in relation to pixels in captured images, for example, an Intel RealSense® camera or a system compatible with the Intel RealSense® platform.

The apparatus may include a 3D mapping module, to determine a 3D map of the environment (or "scene") around the wearer of the output device, such as according to objects identified in images of the scene, such as through segmentation or another object identification process, wherein the object identification process may use the depth information. The apparatus may include a diagnosis module, to identify an absent or impaired human body component of the wearer of the output device.

The proprioception therapy apparatus may include a 3D image generation module to generate an unimpaired human body component object, to place the unimpaired human body component object in the 3D map of the scene, and to generate image(s) corresponding to the placed unimpaired human body component object.

The proprioception therapy apparatus may include a 3D image generation module to generate an unimpaired human body component object, to place the unimpaired human body component object in the 3D map of the scene, and to generate image(s) corresponding to the placed unimpaired human body component object.

The proprioception therapy apparatus may include an output and control module to output cue objects for proprioception therapy, the generated image(s) corresponding to the placed unimpaired human body component object, and/or to output images of the scene, including as such images may be updated according to control input from a user of the output device.

The proprioception therapy apparatus may include an input training module, to determine a correspondence between user input and the behavior of objects (such as the unimpaired human body component object and/or the cue object). User input may include, for example, text, speech, gesture, and muscular-skeletal-nervous system sensor input.

The proprioception therapy apparatus may include a hardware acceleration module to accelerate the performance of the modules by hardware of the proprioception therapy apparatus, for example, to allow the other modules to operate in what a user perceives as real time.

Through these modules, the proprioception therapy apparatus may provide proprioception therapy in a wide range of environments and contexts, without requiring that a user travel to a location of a mirror box. Objects used in the proprioception therapy may engage in a range of behavior. The range of behaviors may include, for example, mirror symmetric behavior in which an image of an unimpaired human body component object mimics, with mirror symmetry, the behavior of a real unimpaired human body component. The range of behaviors may include, for example, behaviors guided by generated images of cue objects.

In this way, the proprioception therapy apparatus may provide proprioception therapy which is more convenient for users and which includes a wider range of behaviors than can be provided through mirror box therapy using a physical mirror box.

FIG. 1 is a network and device diagram illustrating an example of a human 105 with an unimpaired human body component 110, an impaired human body component 120, with the human's attention directed to the unimpaired human body component 110, and an example of output device 115, augmented reality or virtual reality computer 1500 ("AR/VR computer 1500"), and augmented reality or virtual reality computer datastore 1600 ("AR/VR datastore 1600") and network 150, according to some embodiments.

As noted, output device 115 may be, for example, an augmented reality device or a virtual reality device, which may output images, sound, and/or haptic output to human 105. Images by output device 115 may be output as an overlay onto a real world scene which human 105 may view though output device 115 and/or as included in images of the real world scene, which may be processed and output by output device 115. Output device 115 may include a camera, to record images from a normal viewing perspective of human 115. The camera may be coupled to or include a depth sensor or a depth camera. Depth information from the depth sensor may be obtained in conjunction with the images, such as a camera which obtains RGB and depth information in relation to pixels in captured images, for example, an Intel RealSense® camera or a system compatible with the Intel RealSense® platform. Image data, such as RGB and depth information in relation to pixels, may be stored in, for example, one or more image data 1605 records.

Figure 15:
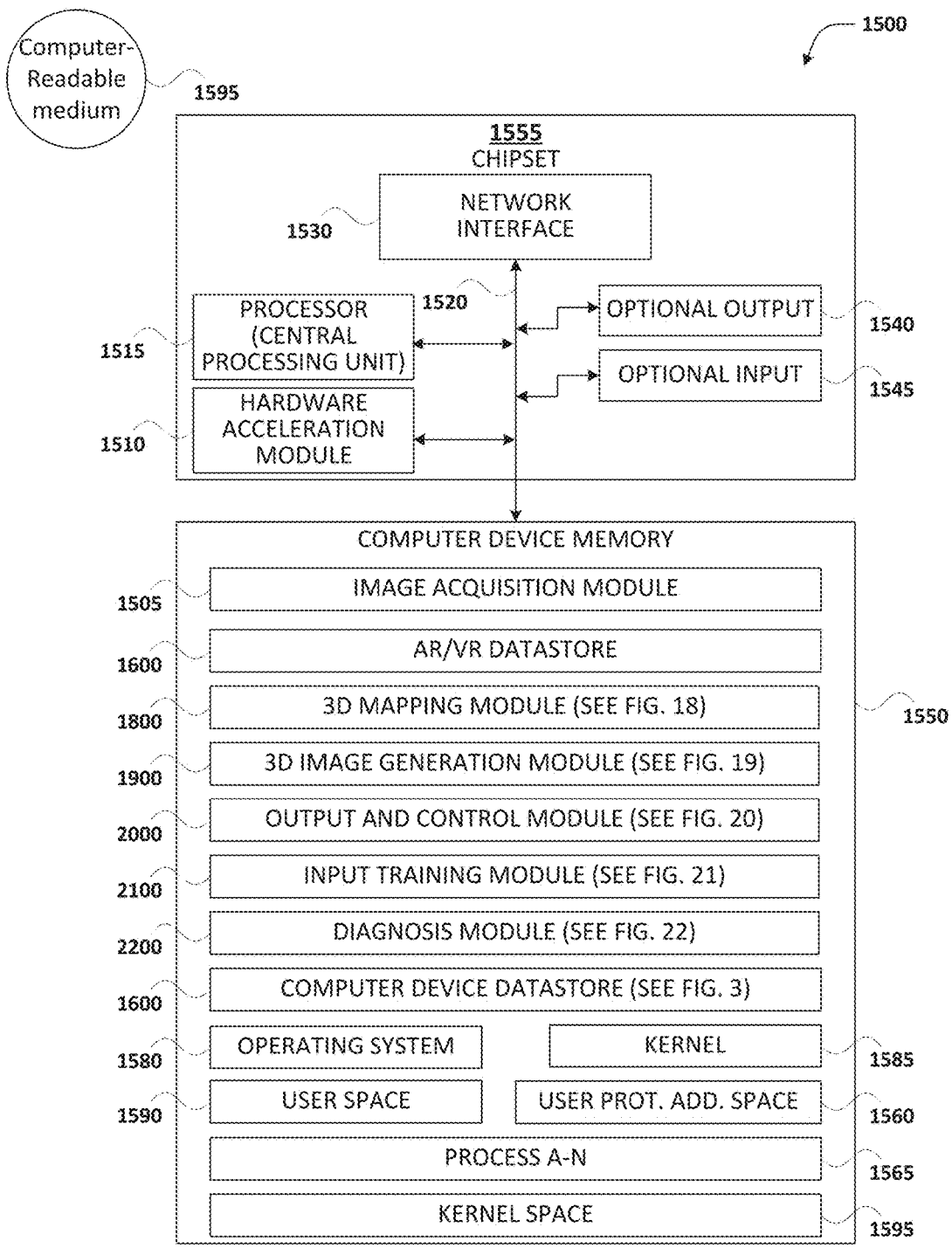
FIG. 15 is a functional block diagram illustrating an example of a proprioception therapy computer device incorporated with teachings of the present disclosure, according to some embodiments.

Output device 115 illustrated in FIG. 1 may be connected with network 150 and/or AR/VR computer 1500, described further in relation to FIG. 15. AR/VR computer 1500 may be incorporated into output device 115 and/or may be a separate support computer, providing, for example, hardware acceleration module 1510 to accelerate and/or provide performance of modules described herein.

AR/VR computer 1500 is illustrated as connecting to AR/VR datastore 1600. AR/VR datastore 1600 is described further, herein, though, generally, should be understood as a datastore used by AR/VR computer 1500.

Network 150 may comprise computers, network connections among the computers, and software routines to enable communication between the computers over the network connections. Examples of Network 150 comprise an Ethernet network, the Internet, and/or a wireless network, such as a GSM, TDMA, CDMA, EDGE, HSPA, LTE or other network provided by a wireless service provider. Connection to Network 150 may be via a Wi-Fi connection. More than one network may be involved in a communication session between the illustrated devices. Connection to Network 150 may require that the computers execute software routines which enable, for example, the seven layers of the OSI model of computer networking or equivalent in a wireless phone network.

FIG. 1 also illustrates table 103, which may be a table in the environment of human 105.

In FIG. 1, human 105 directs attention to unimpaired human body component 110. Direction of attention to unimpaired human body component 110 may be a trigger for or in conformance with instruction for proprioception therapy, wherein the proprioception therapy involves generation of an unimpaired human body component object, generation of a cue for a behavior, placement of the generated unimpaired human body component object in the scene before human 105, generation of corresponding images, and output of the generated images such that human 105 appears to engage with the cue with the generated unimpaired human body component object.

An image acquisition module in, for example, AR/VR computer 1500, such as image acquisition module 1505, obtains image data 1605 record and prepares one or more 3D maps of scene. The location, address, GPS coordinates, imaging orientation, and other identifying information of scene may be recorded as one or more scene 1610 records. The 3D map(s) may be stored as, for example, one or more 3D map 1640 records.

Figure 18:
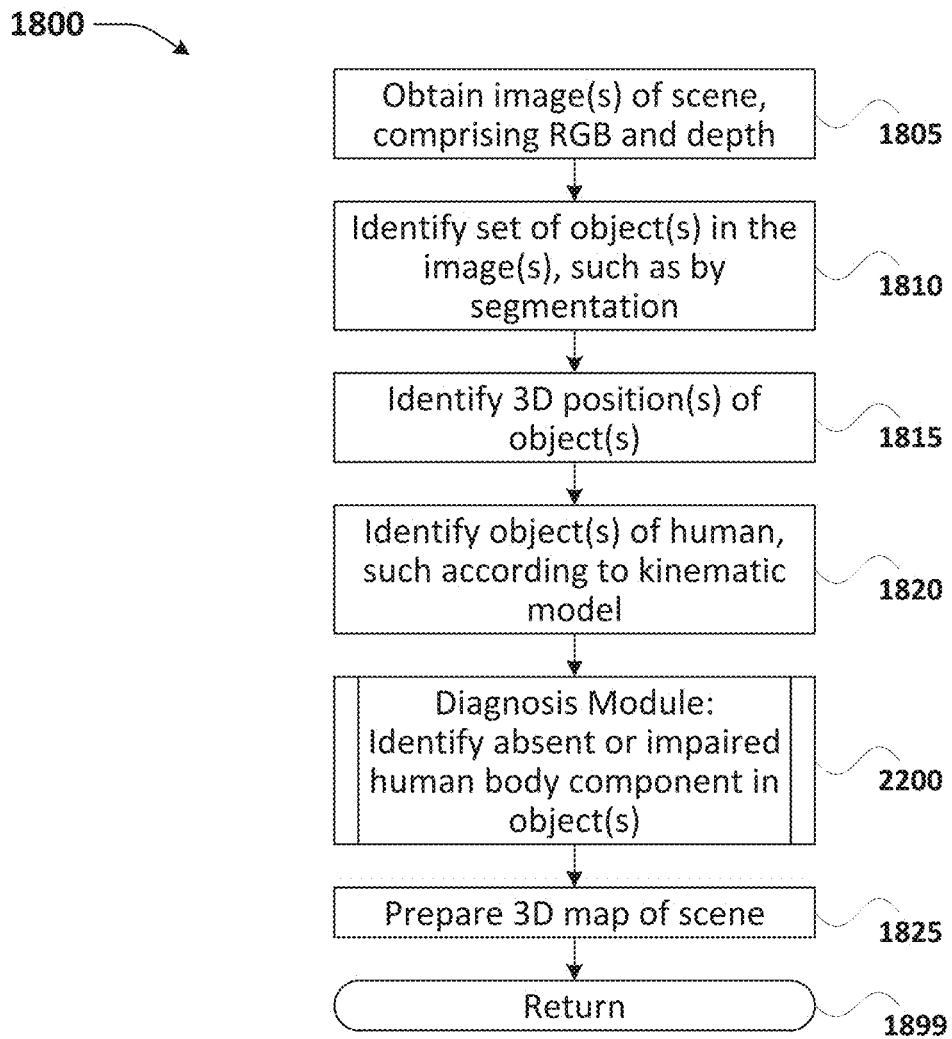
FIG. 18 is a flow diagram illustrating an example of a method performed by a 3D mapping module, according to some embodiments.

As described further in relation to FIG. 18, image acquisition module may identify objects in image data 1605, such as according to segmentation. Identified objects may be stored as, for example, one or more object 1620 records.

Image acquisition module may identify a position of the objects according to, for example, pixel depth and coordinate data in image data. Image acquisition module may determine which of object 1620 records comprise objects of human 105. This may be determined according to, for example, a kinematic model of human 105 and/or of an idealized, average, or composite form of a kinematic model of human 105 across many instances.

Figure 2:
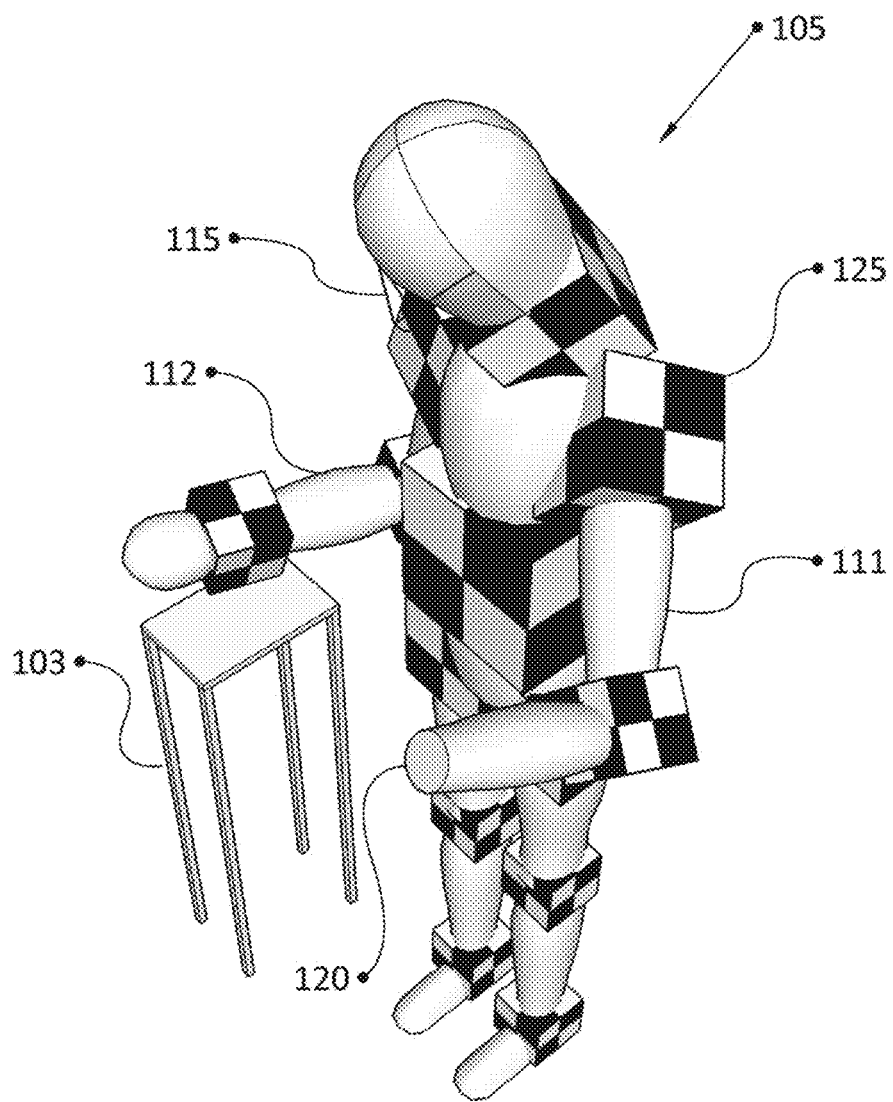
FIG. 2 illustrates the view of the human of FIG. 1, with rigid bodies and joints identified, according to some embodiments.

For example, FIG. 2 illustrates the view of the human of FIG. 1, with rigid bodies and joints identified, according to a kinematic model. Examples of rigid bodies include, for example, forearm 112, and upper arm 111. Examples of joints include, for example, joint 125. Angle(s) of joint(s), relative to degrees of freedom and/or relative position of rigid bodies may be determined.

Image acquisition module of AR/VR computer 1500 may obtain or determine a diagnosis in relation to human 105, for example, to determine that impaired human body component 120 is not present. The diagnosis may be determined by a diagnosis module, such as diagnosis module 2200, described further in relation to FIG. 22, and/or may be provided by external input, such as from human 105 and/or a medical service provider. The diagnosis may be based on rigid bodies, joints, and kinematic constraints determined in relation in relation to human 105.

AR/VR computer 1500 may execute a 3D image generation module to place a cue and/or an unimpaired human body component object in 3D map of the scene and to generate image(s) of the placed cue and/or human body component objects. The generated images may be visually placed in human 105's view of impaired human body component 120.

These and other aspects of the proprioception apparatus and method will be further described with references to the remaining Figures. However, it should be noted that while for ease of understanding, FIGS. 1-13 illustrate the non-impaired and impaired human body components as the forearm/hand of the human, the present disclosure is not so limited. The proprioception apparatus and method may be respected for other non-impaired and impaired human body components, e.g., legs of human 105. Similarly, while for ease of understanding, FIG. 1 illustrate the display device 115, AR/VR computer 1500 and AR/VR database 1600 as separate components. In alternate embodiments, two or more of the elements may be combined together, e.g., but not limited to combining display device 115 and AR/VR computer 1500, or combining AR/VR computer 1500 and AR/VR database 1600.

Figure 3:
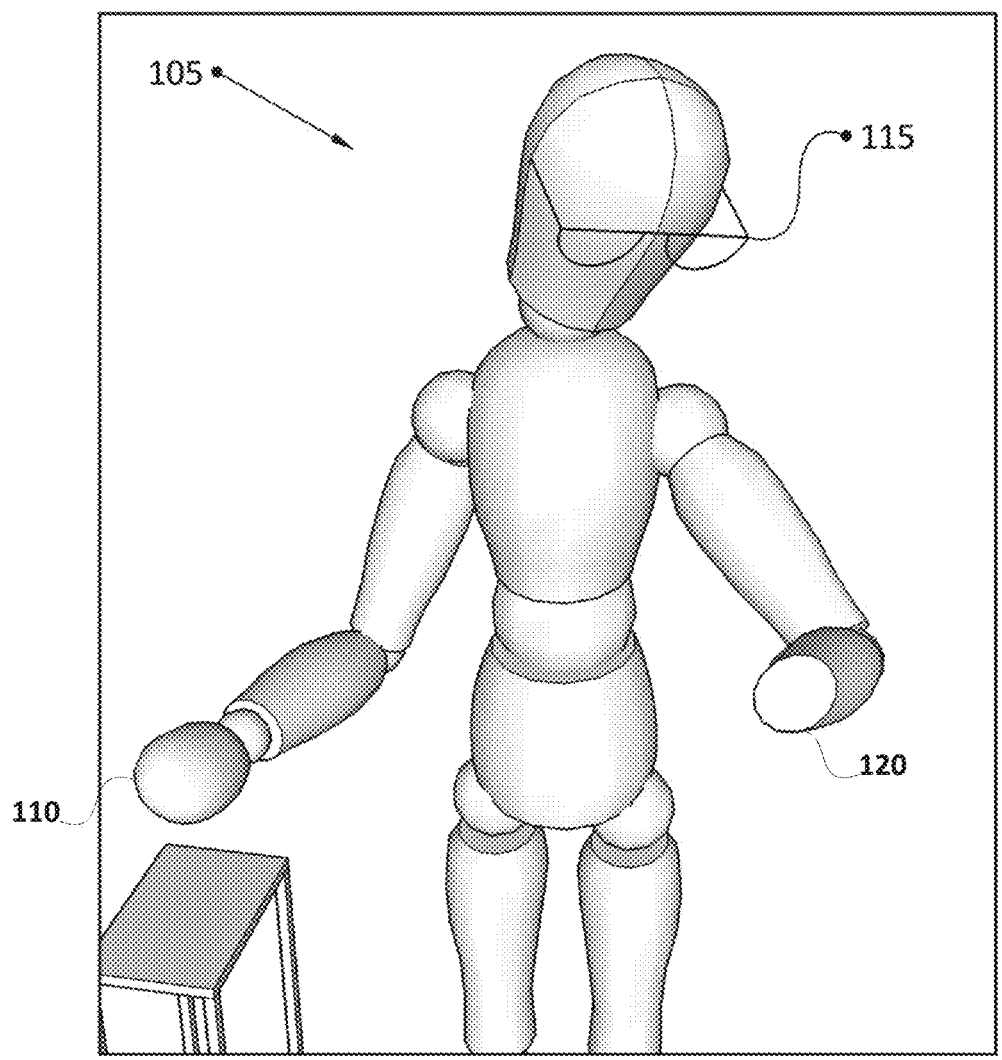
FIG. 3 illustrates a view of a human with an unimpaired human body component, an impaired human body component, and at least one output device, with the human's attention directed to the impaired human body component, according to some embodiments.

FIG. 3 illustrates a view of human 105, unimpaired human body component 110, impaired human body component 120, output device 115, with human 105's attention directed to impaired human body component 120, according to some embodiments. Direction of human 105's attention at impaired human body component 120 may be a trigger to and/or may be in response to an instruction to output generated image(s) of the cue and/or unimpaired human body component object.

Figure 4:
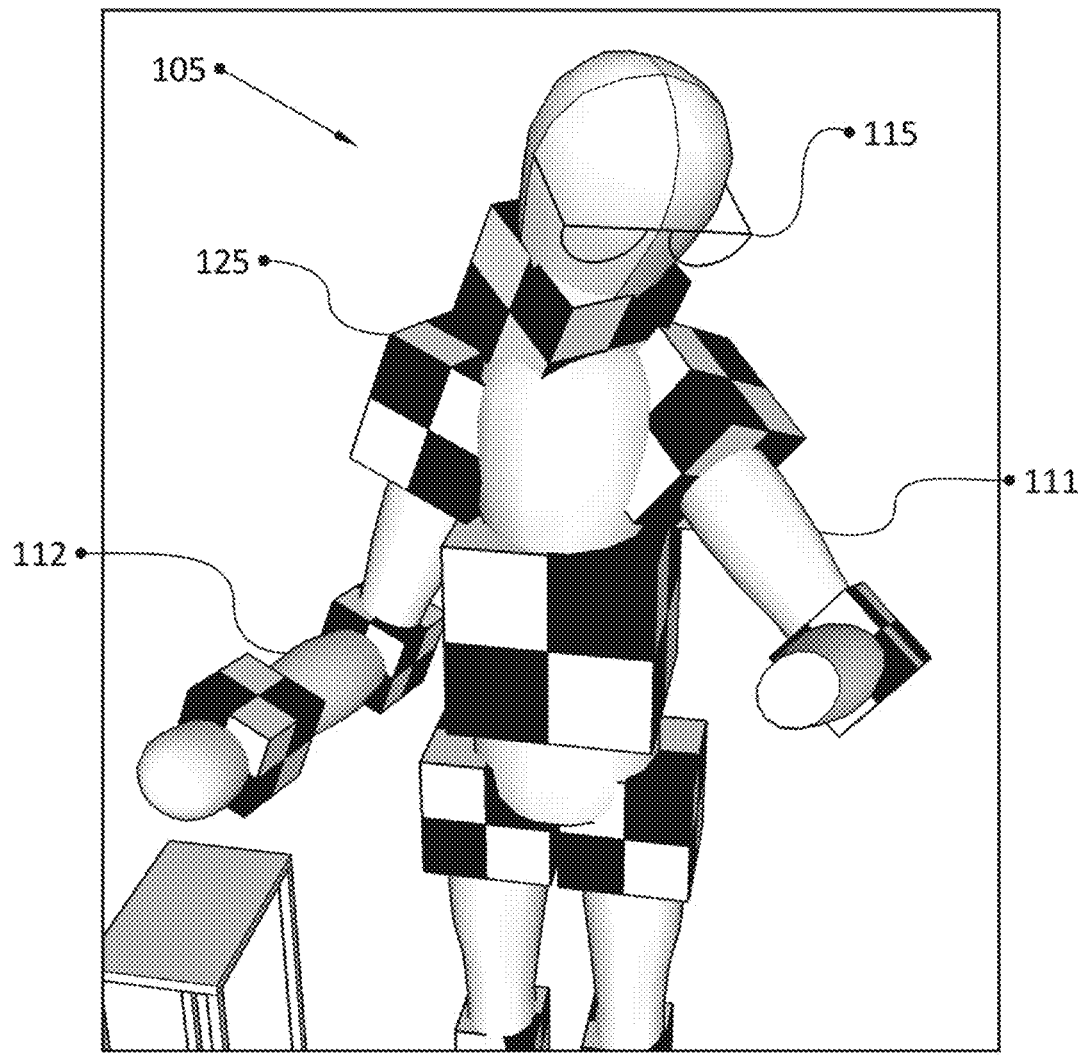
FIG. 4 illustrates the view of the human and output device of FIG. 3, with rigid bodies and joints identified, according to some embodiments.

FIG. 4 illustrates the view of the human and computer device of FIG. 3, with rigid bodies and joints identified, according to some embodiments. Rigid bodies may include, for example upper arm 111, forearm 112, and joint 125. Identification of rigid bodies and joints may be performed iteratively over image data by, for example, 3D image generation module, such that an unimpaired human body component object may be determined and images thereof placed in the field of view of human 105 in the location of impaired human body component 120.

Figure 5:
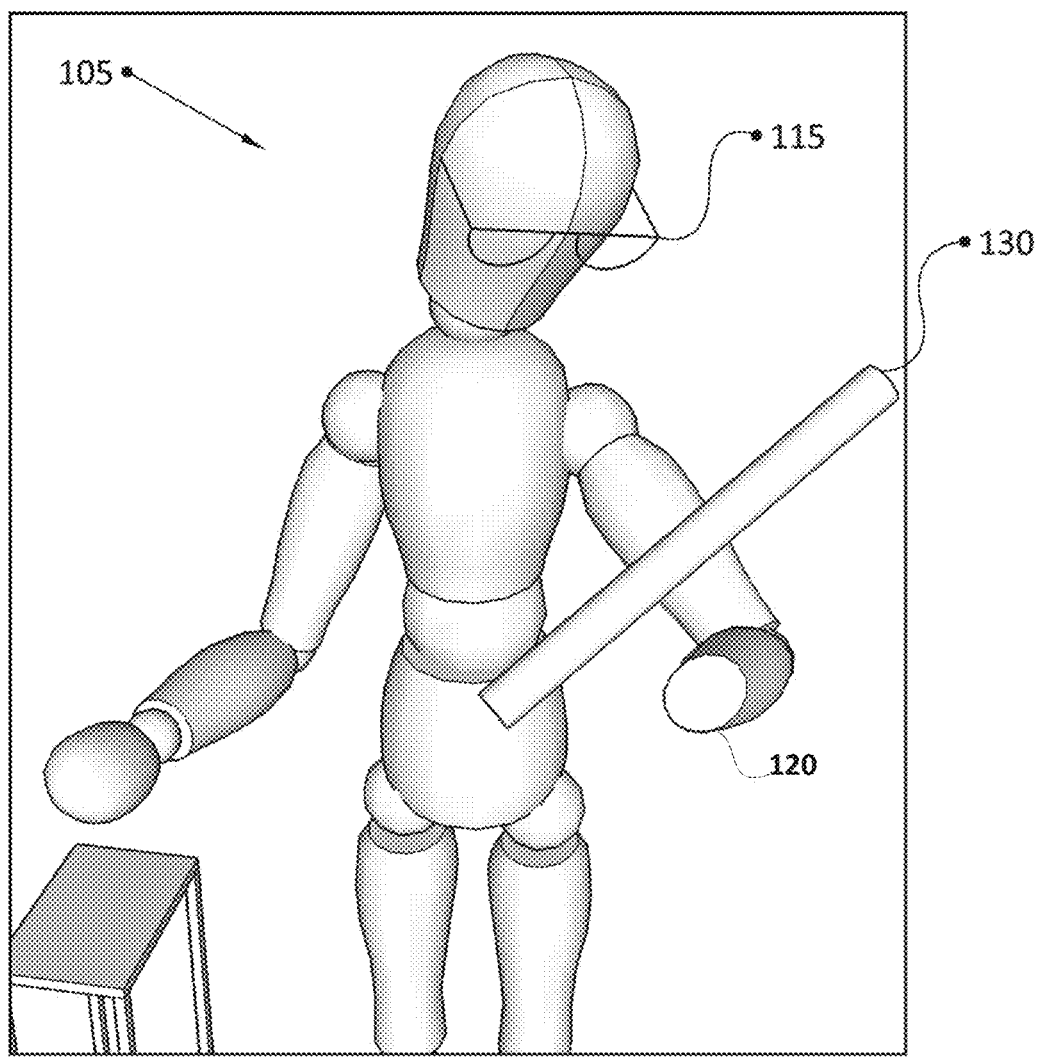
FIG. 5 illustrates the view of the human of FIG. 3, further comprising a rendered image of a cue object for proprioception therapy, according to some embodiments.

FIG. 5 illustrates the view of human 105 of FIG. 3, further comprising a rendered image of a cue object 130 for proprioception therapy, according to some embodiments in the field of view of human 105. Cue object 130 may be generated by an output and control module of AR/VR Computer 1500, such as output ad control module 2000, described further in relation to FIG. 20 (processes to generate cue object 130 may be located in other of the modules, such as in 3D image generation module). Cue object 130 may be an instruction to human 105 to attempt to grasp cue object 130 with impaired human body component 120.

AR/VR computer 1500 may execute 3D image generation module to place images of an unimpaired human body component object in the field of view of human 105 in the location of impaired human body component 120, for example, to provide proprioception therapy.

Figure 6:
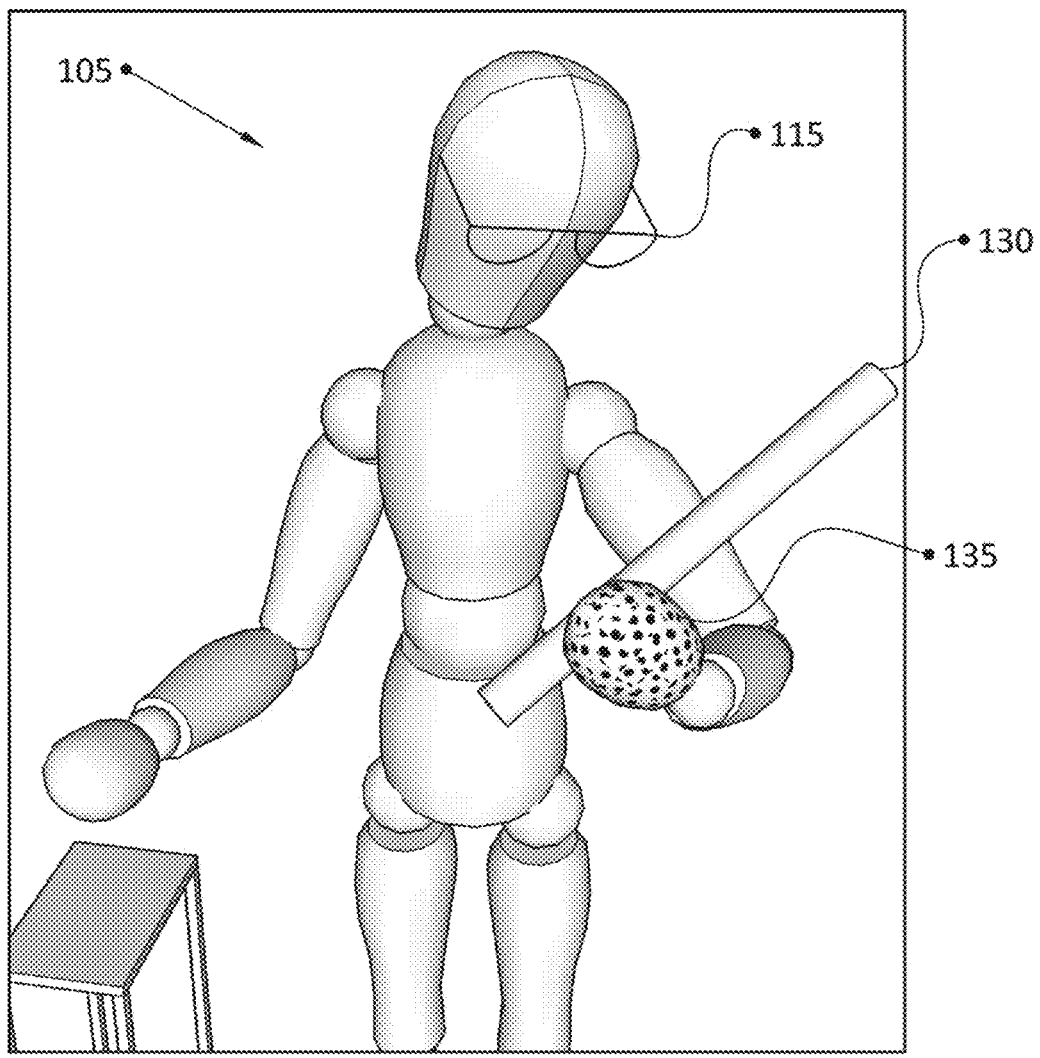
FIG. 6 illustrates the view of the human and cue object of FIG. 5, further comprising a rendered image of an unimpaired human body component object, according to some embodiments.

FIG. 6 illustrates the view of human 105 and cue 130 of FIG. 5, further comprising a rendered image of unimpaired human body component object 135 in the field of view of human 105, according to some embodiments. AR/VR computer 1500 may execute, for example, an output and control module to output rendered image of unimpaired human body component object 135 and to allow human 105 to control unimpaired human body component object 135.

Figure 7:
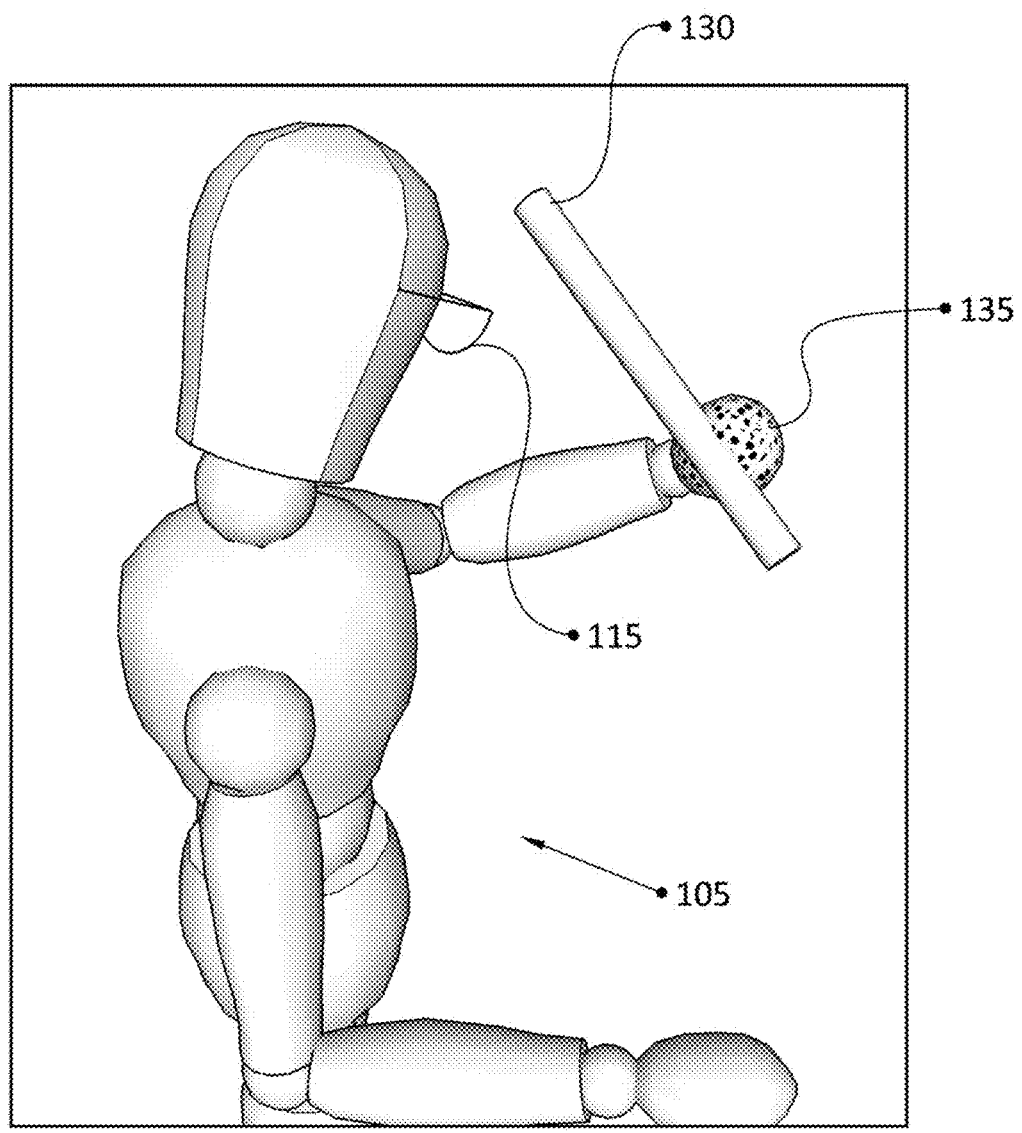
FIG. 7 illustrates another view of the human, cue object, and unimpaired human body component object of FIG. 6, according to some embodiments.

FIG. 7 illustrates another view of human 105, cue object 130, and unimpaired human body component object 135 of FIG. 6, according to some embodiments. FIG. 7 illustrates that unimpaired human body component object 135 may appear to touch and/or overlap with cue object 130. Fingers in unimpaired human body component object 135 (not illustrated) may be made to grasp cue object 130. Cue object 130 and/or unimpaired human body component object 135 may appear to move with arm of human 105.

Figure 8:
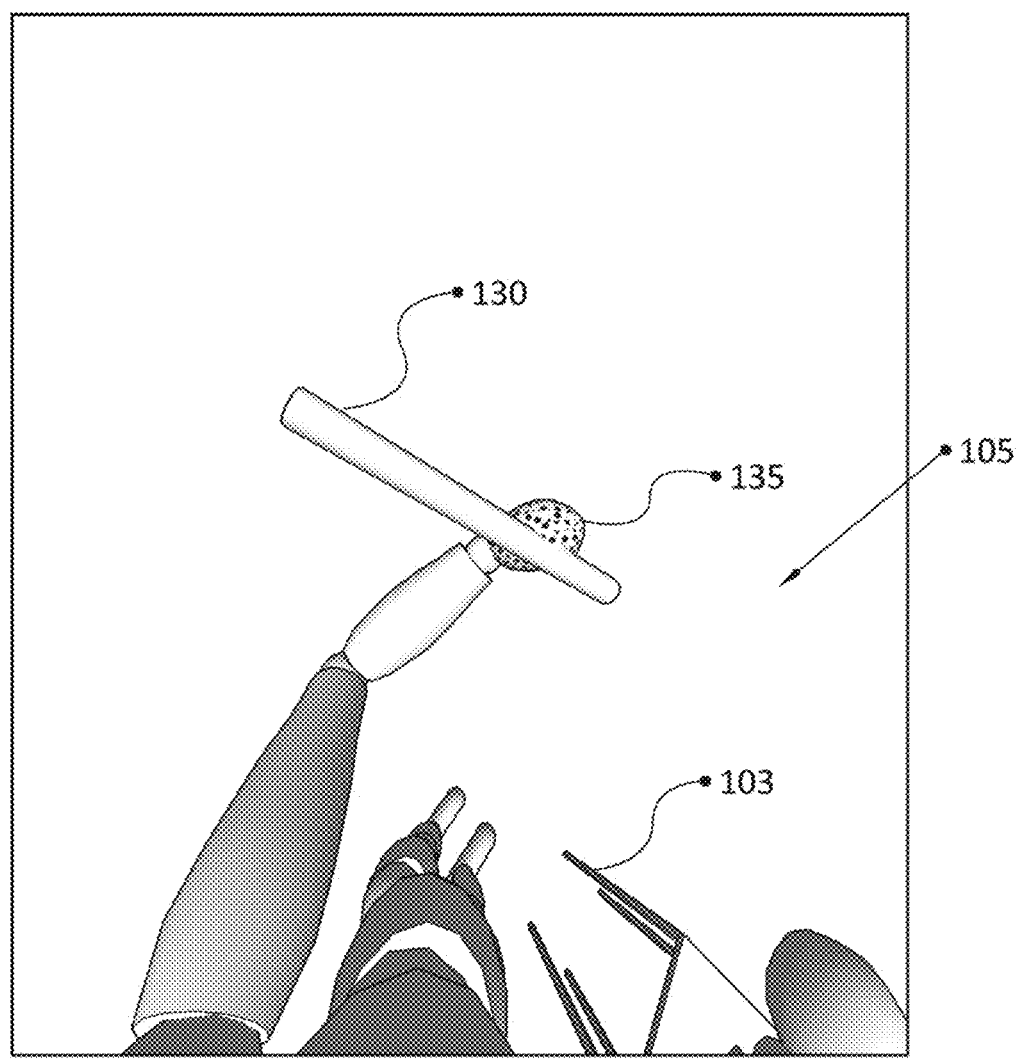
FIG. 8 illustrates another view of the human, cue object, and unimpaired human body component object of FIG. 6, such as according to a perspective of the output device, according to some embodiments.

FIG. 8 illustrates another view of human 105, cue object 130, and unimpaired human body component object 135 of FIG. 6, such as according to a perspective of output device 115, according to some embodiments. FIG. 8 illustrates the perspective of image data captured and/or used by AR/VR computer and the modules discussed above, as well as the perspective of human 105 relative to cue object 130 and unimpaired human body component object 135.

Figure 9:
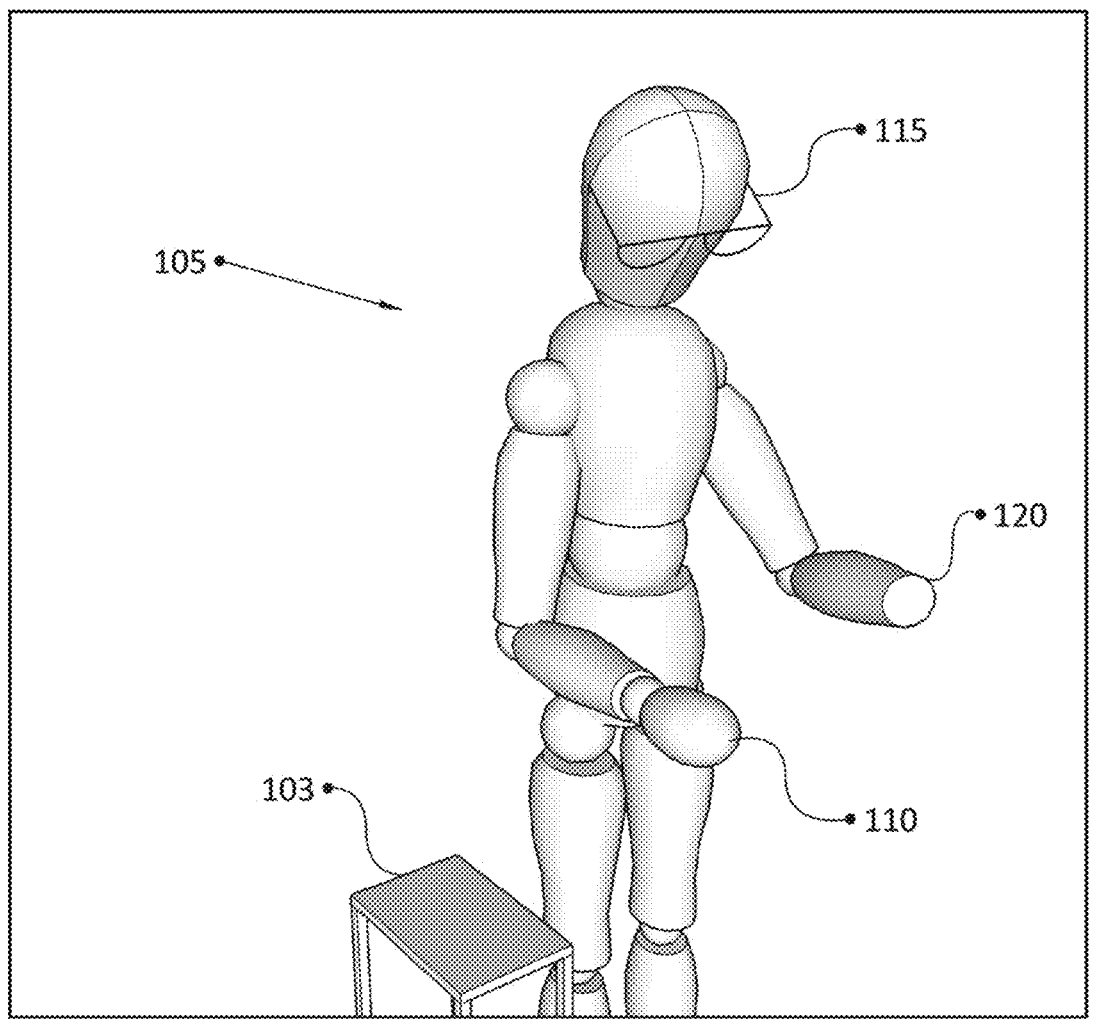
FIG. 9 illustrates a view of a human with an unimpaired human body component, an impaired human body component, and an output device, according to some embodiments.

FIG. 9 illustrates a view of human 105 with unimpaired human body component 110, impaired human body component 120, and output device 115, according to some embodiments. In FIG. 9, human 105 is generally directing human 105's attention intermediate between unimpaired human body component 110 and impaired human body component 120. This may be pursuant to an instruction and/or may be a trigger to initiate proprioception therapy with mirror symmetric behavior.

Figure 10:
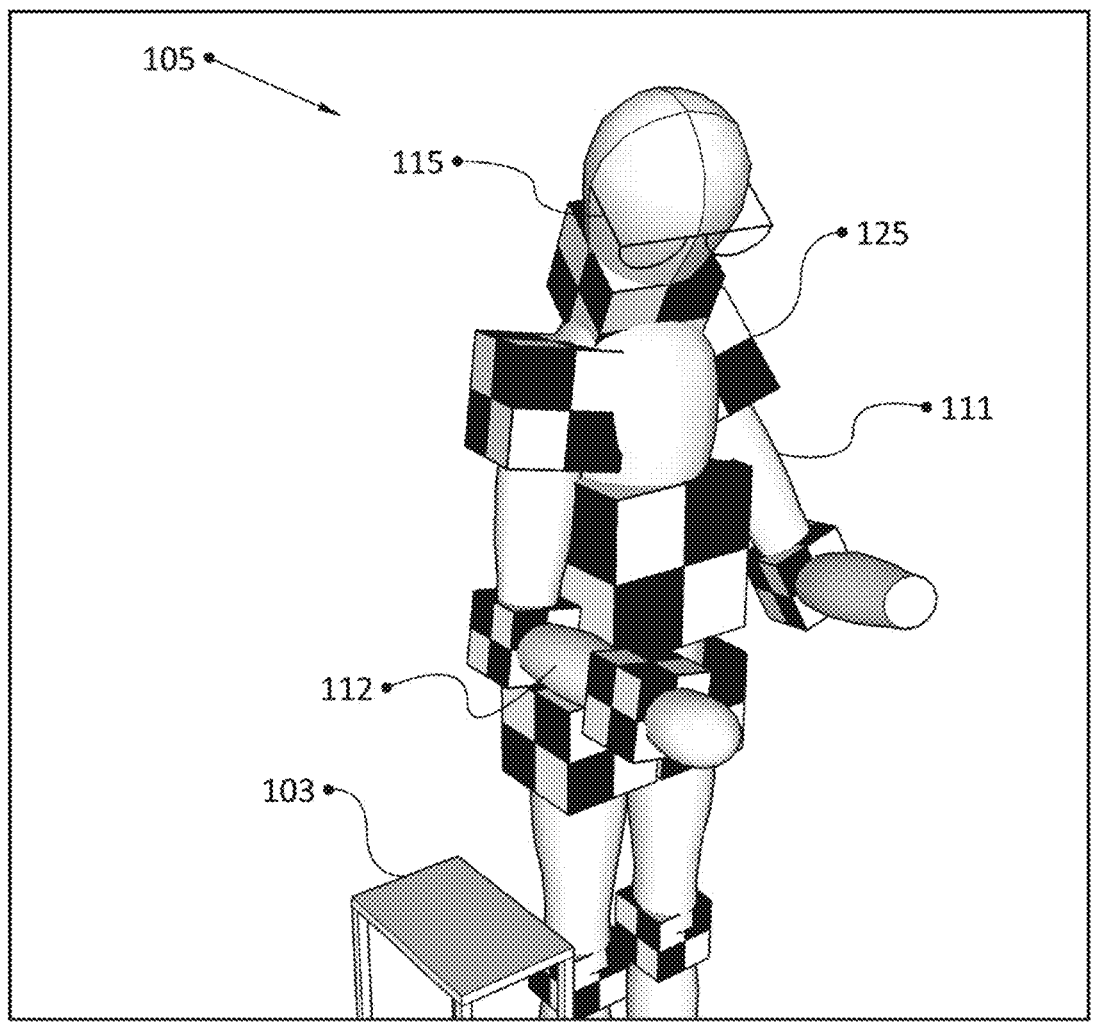
FIG. 10 illustrates the view of the human and output device of FIG. 9, with rigid bodies and joints identified, according to some embodiments.

FIG. 10 illustrates the view of human 105 and output device 115 of FIG. 9, with rigid bodies and joints identified, according to some embodiments. Rigid bodies may include, for example upper arm 111, forearm 112, and joint 125. Identification of rigid bodies and joints may be performed iteratively over image data by, for example, 3D image generation module, such that an unimpaired human body component object may be determined and images thereof placed in the field of view of human 105 in the location of impaired human body component 120, in this instance, to provide proprioception therapy with mirror symmetric behavior.

Figure 11:
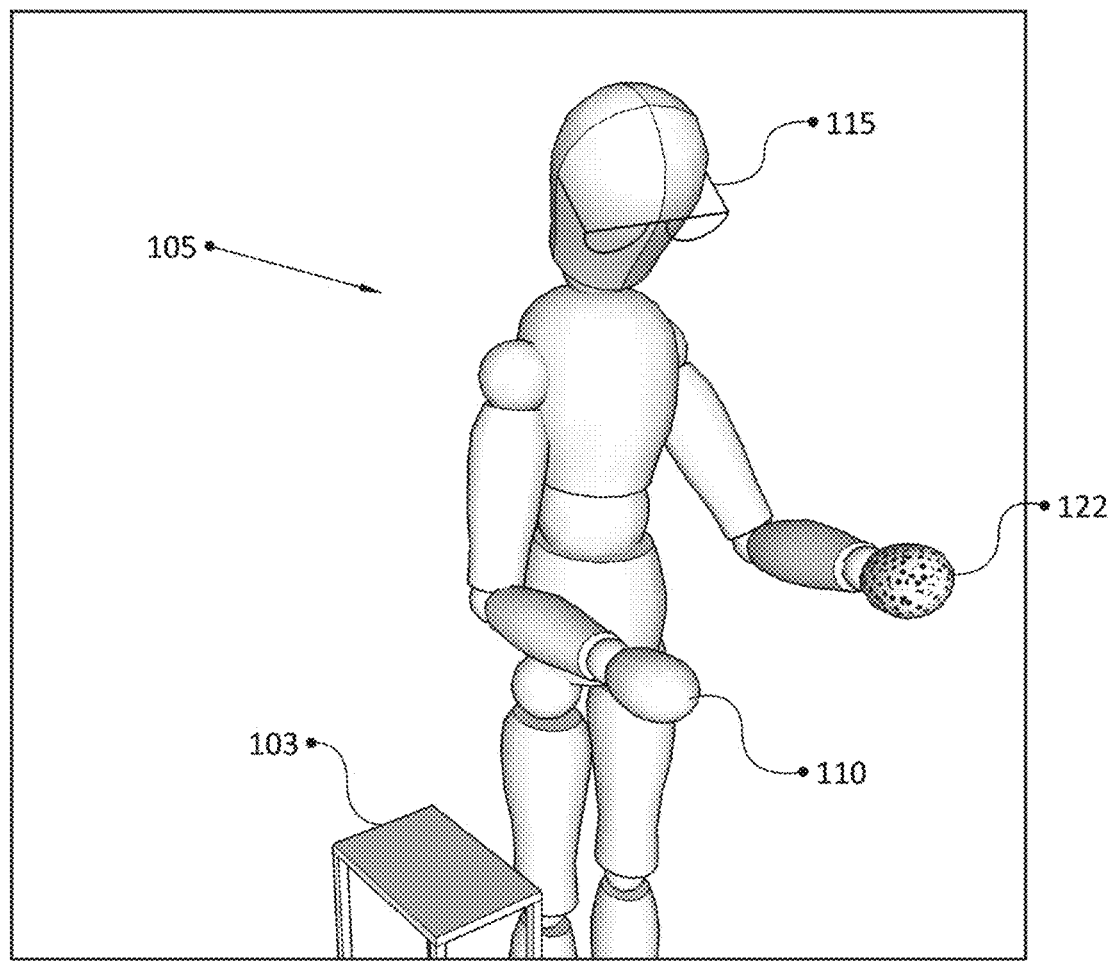
FIG. 11 illustrates the view of the human and output device of FIG. 9, further comprising a rendered image of an unimpaired human body component object, according to some embodiments.

FIG. 11 illustrates the view of human 105 and output device 115 of FIG. 9, further comprising a rendered image of unimpaired human body component object 122 engaging in mirror symmetric behavior, according to some embodiments. To generate and output such images, AR/VR computer 1500 may iteratively perform, for example, an output and control module. Output and control module may map movement of unimpaired human body component 110 to movement of rendered image of unimpaired human body component object 122, with mirror symmetric orientation. For example, as human 105 moves fingers (not illustrated) of unimpaired human body component 110, corresponding fingers of unimpaired human body component object 122 may move with mirror symmetric orientation.

Figure 12:
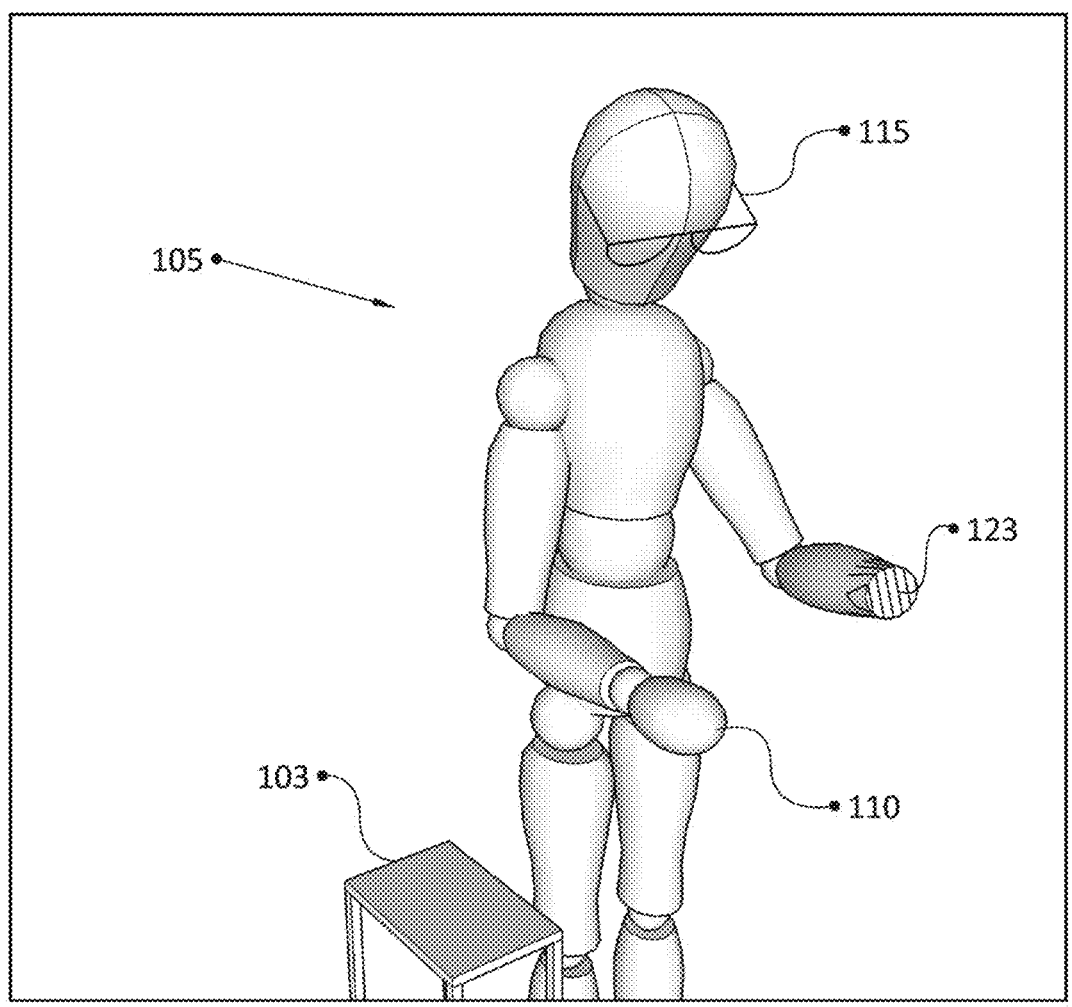
FIG. 12 illustrates a view of a human with an unimpaired human body component, an impaired human body component, an output device, and a muscular-skeletal-nervous system sensor, according to some embodiments.

FIG. 12 illustrates a view of human 105 with unimpaired human body component 110, an impaired human body component (not labeled), output device 115, and muscular-skeletal-nervous system sensor 123, according to some embodiments. Muscular-skeletal-nervous system sensor 123 may be, for example, a sensor of acceleration, movement, pressure, blood flow, temperature, nervous system activity, and the like. Muscular-skeletal-nervous system sensor 123 may provide input to control a rendered image of unimpaired human body component object, to control an actuator (including of a prosthetic arm), or the like. Muscular-skeletal-nervous system sensor 123 may be located on or proximate to an impaired human body component and/or elsewhere on a human.

Figure 13:
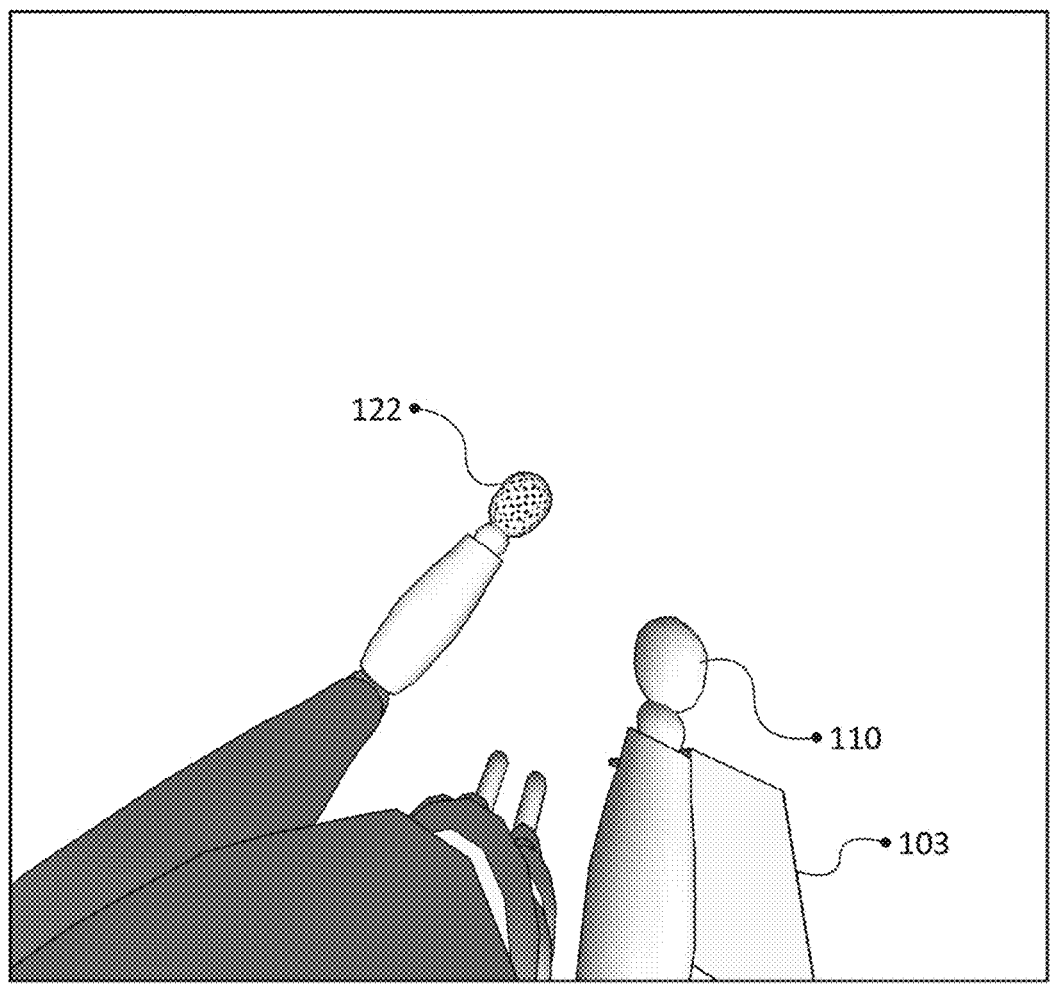
FIG. 13 illustrates another view of the human and unimpaired human body component object of FIG. 11, such as according to a perspective of the output device, according to some embodiments.

FIG. 13 illustrates another view of human 105 and unimpaired human body component object 122 of FIG. 11, such as according to a perspective of output device 115 and human 105, according to some embodiments. FIG. 13 illustrates, for example, the perspective of image data captured and/or used by AR/VR computer and the modules discussed above, as well as the perspective of human 105 and output device 115 relative to unimpaired human body component object 122 and unimpaired human body component 110. Alignment between unimpaired human body component object 122 and unimpaired human body component 110 does not need to be exact to provide mirror symmetric behavior.

Figure 14:
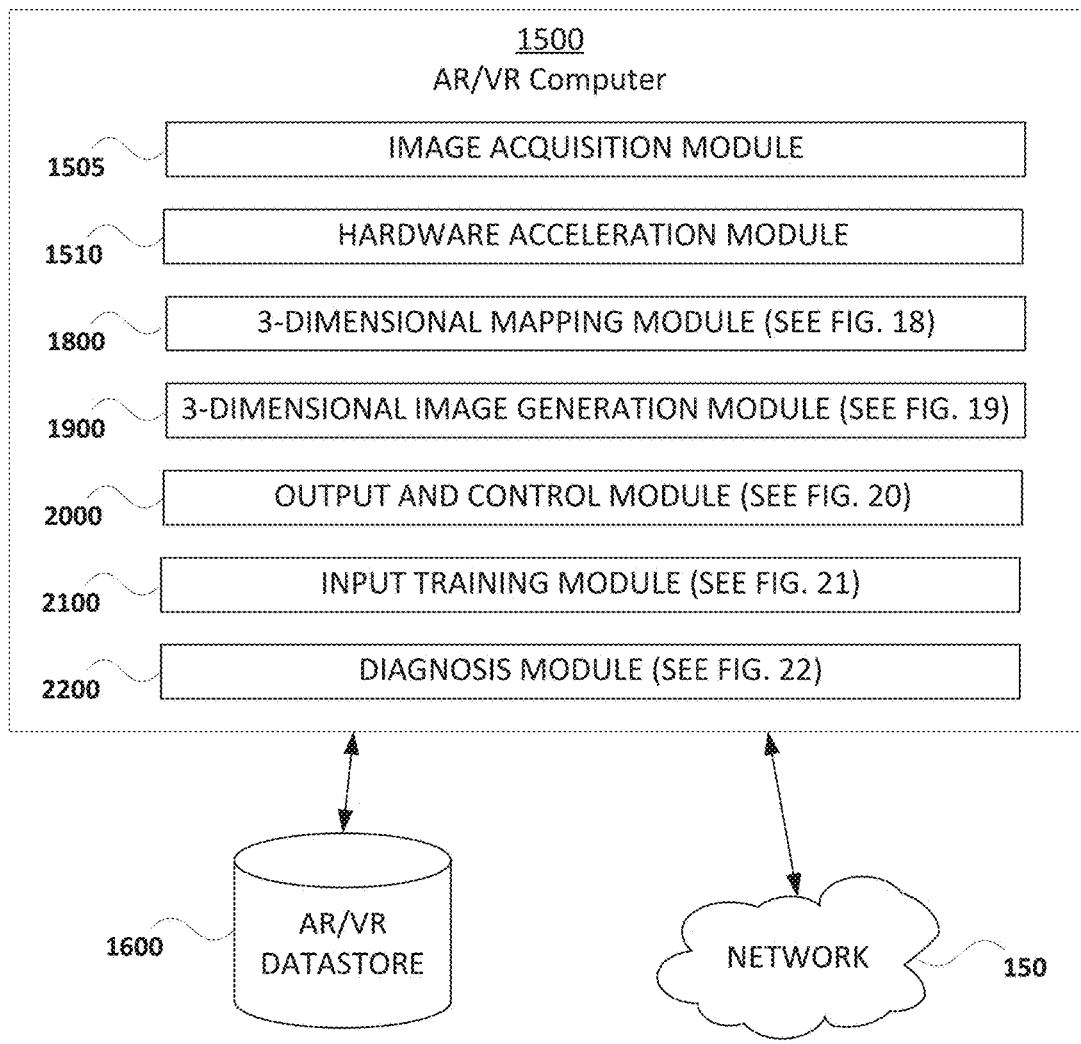
FIG. 14 is a network and device diagram illustrating an example of a proprioception therapy computer device, a proprioception therapy computer device datastore, and a network incorporated with teachings of the present disclosure, according to some embodiments.

FIG. 14 is a network and device diagram illustrating an example of proprioception therapy computer device, such as AR/VR computer 1500, a proprioception therapy computer device datastore, such as AR/VR datastore 1600, and network 150 incorporated with teachings of the present disclosure, according to some embodiments. FIG. 14 illustrates that AR/VR computer 1500 may comprise modules for, for example, image acquisition module 1505, hardware acceleration module 1510, 3D mapping module 1800, 3D image generation module 1900, output and control module 2000, input training module 2100, and diagnosis module 2200.

FIG. 15 is a functional block diagram illustrating an example of a proprioception therapy computer device, such as AR/VR computer 1500, incorporated with teachings of the present disclosure, according to some embodiments. AR/VR computer 1500 may include chipset 1555. Chipset 1555 may include processor 1515, input/output (I/O) port(s) and peripheral devices, such as output 1540 and input 1545, and network interface 1530, and computer device memory 1550, all interconnected via bus 1520. Network interface 1530 may be utilized to form connections with network 150, with AR/VR datastore 1600, or to form device-to-device connections with other computers.

Chipset 1555 may include communication components and/or paths, e.g., buses 1520, that couple processor 1515 to peripheral devices, such as, for example, output 1540 and input 1545, which may be connected via I/O ports. Processor 1515 may include one or more execution cores (CPUs). For example, chipset 1555 may also include a peripheral controller hub (PCH) (not shown). In another example, chipset 1555 may also include a sensors hub (not shown). Input 1545 and output 1540 may include, for example, user interface device(s) including a display, a touch-screen display, printer, keypad, keyboard, etc., sensor(s) including accelerometer, global positioning system (GPS), gyroscope, etc., communication logic, wired and/or wireless, storage device(s) including hard disk drives, solid-state drives, removable storage media, etc. I/O ports for input 1545 and output 1540 may be configured to transmit and/or receive commands and/or data according to one or more communications protocols. For example, one or more of the I/O ports may comply and/or be compatible with a universal serial bus (USB) protocol, peripheral component interconnect (PCI) protocol (e.g., PCI express (PCIe)), or the like.

Hardware acceleration module 1510 may provide hardware acceleration of various functions otherwise performed by 3D mapping modules 1800, 3D image generation module 1900, output and control module 2000, input training module 2100, and/or diagnosis module 2200, for example, object identification, such as via segmentation. Hardware acceleration module may be provided by, for example, Integrated Performance Primitives software library by Intel Corporation, preferably as executed by an Intel (or other compatible) chip, and which may implement, for example, a library of programming functions involved with real time computer vision. Such a library includes, for example, OpenCV. OpenCV includes, for example, application areas including 2D and 3D feature toolkits, egomotion estimation, facial recognition, gesture recognition, human-computer interaction, mobile robotics, motion understanding, object identification, segmentation and recognition, stereopsis stereo vision (including depth perception from two cameras), structure from motion, motion tracking, and augmented reality. OpenCV also includes a statistical machine learning library including boosting, decision tree learning, gradient boosting trees, expectation-maximization algorithms, k-nearest neighbor algorithm, naïve Bayes classifier, artificial neural networks, random forest, and a support vector machine. In embodiments, hardware acceleration module 1510 may be a programmed FPGA, i.e., a FPGA which gate arrays are configured with a bit stream to embody the logic of the hardware accelerated function (equivalent to the logic provided by the executable instructions of a software embodiment of the function). In embodiments, hardware acceleration module 1510 may also or alternatively include components of or supporting computer device memory 1550.

Computer device memory 1550 may generally comprise a random access memory ("RAM"), a read only memory ("ROM"), and a permanent mass storage device, such as a disk drive or SDRAM (synchronous dynamic random-access memory). Computer device memory 1550 may store program code for modules and/or software routines, such as, for example, image acquisition module 1505, hardware acceleration module 1510, AR/VR datastore 1600 (illustrated and discussed further in relation to FIG. 16), 3D mapping module 1800 (illustrated and discussed further in relation to FIG. 18), 3D image generation module 1900 (illustrated and discussed further in relation to FIG. 19), output and control module 2000 (illustrated and discussed further in relation to FIG. 20), input and training module 2100 (illustrated and discussed further in relation to FIG. 21), and diagnosis module 2200 (illustrated and discussed further in relation to FIG. 22).

Computer device memory 1550 may also store operating system 1580. These software components may be loaded from a non-transient computer readable storage medium 1595 into computer device memory 1550 using a drive mechanism associated with a non-transient computer readable storage medium 1595, such as a floppy disc, tape, DVD/CD-ROM drive, memory card, or other like storage medium. In some embodiments, software components may also or instead be loaded via a mechanism other than a drive mechanism and computer readable storage medium 1595 (e.g., via network interface 1530).

Figure 16:
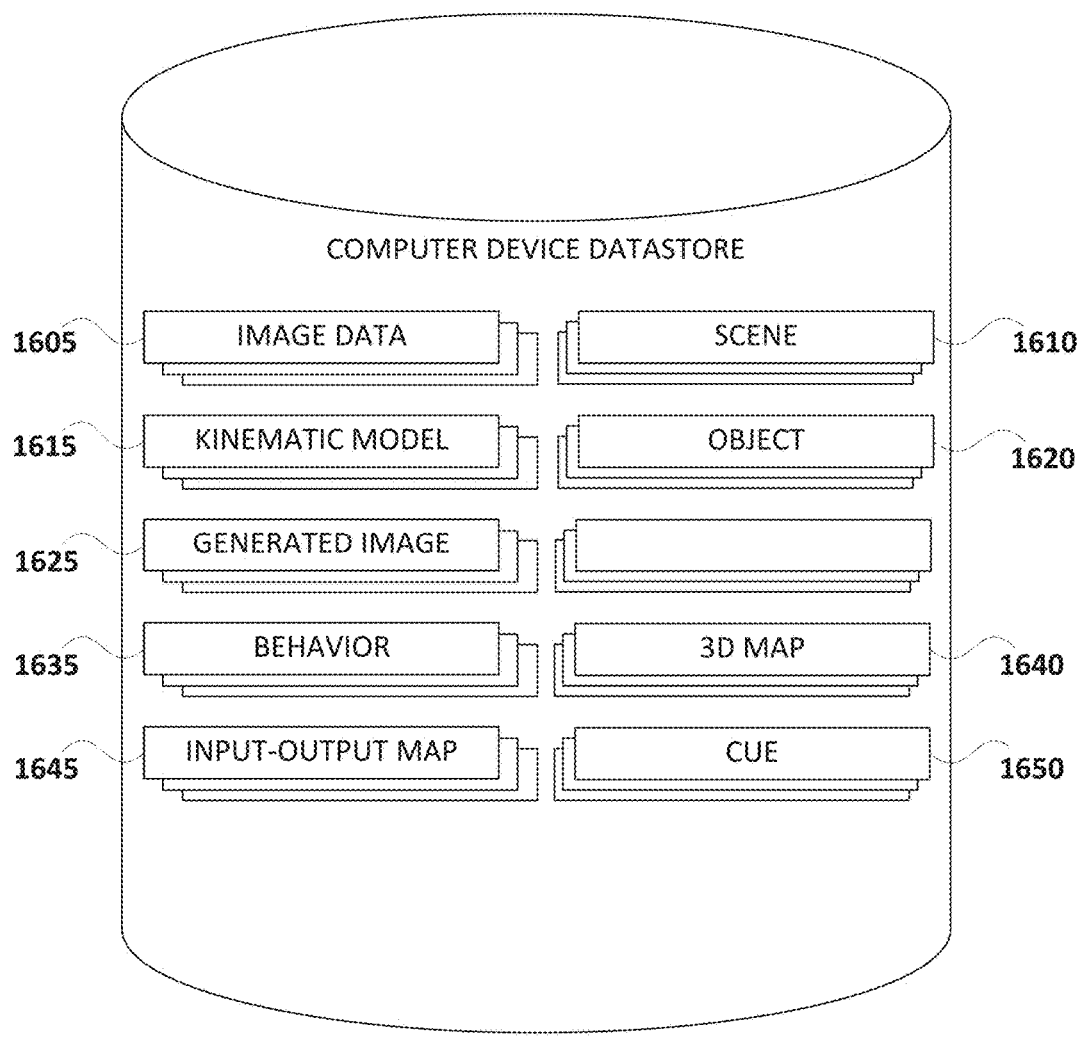
FIG. 16 is a functional block diagram illustrating an example of a proprioception therapy computer device datastore incorporated with teachings of the present disclosure, consistent with embodiments of the present disclosure.

Computer device memory 1550 is also illustrated as comprising kernel 1585, kernel space 1595, user space 1590, user protected address space 1560, and AR/VR datastore 1600 (illustrated and discussed further in relation to FIG. 16).

Computer device memory 1550 may store one or more process 1565 (i.e., executing software application(s)). Process 1565 may be stored in user space 1590. Process 1565 may include one or more other process 1565*a* . . . 1565*n*. One or more process 1565 may execute generally in parallel, i.e., as a plurality of processes and/or a plurality of threads.

Computer device memory 1550 is further illustrated as storing operating system 1580 and/or kernel 1585. The operating system 1580 and/or kernel 1585 may be stored in kernel space 1595. In some embodiments, operating system 1580 may include kernel 1585. Operating system 1580 and/or kernel 1585 may attempt to protect kernel space 1595 and prevent access by certain of process 1565*a* . . . 1565*n*.

Kernel 1585 may be configured to provide an interface between user processes and circuitry associated with AR/VR computer 1500. In other words, kernel 1585 may be configured to manage access to processor 1515, chipset 1555, I/O ports and peripheral devices by process 1565. Kernel 1585 may include one or more drivers configured to manage and/or communicate with elements of AR/VR computer 1500 (i.e., processor 1515, chipset 1555, I/O ports and peripheral devices).

AR/VR computer 1500 may also comprise or communicate via Bus 1520 and/or network interface 1530 with AR/VR datastore 1600, illustrated and discussed further in relation to FIG. 16. In various embodiments, bus 1520 may comprise a high speed serial bus, and network interface 1530 may be coupled to a storage area network ("SAN"), a high speed wired or wireless network, and/or via other suitable communication technology. AR/VR computer 1500 may, in some embodiments, include many more components than as illustrated. However, it is not necessary that all components be shown in order to disclose an illustrative embodiment.

FIG. 16 is a functional block diagram of the AR/VR datastore 1600 illustrated in the computer device of FIG. 15, according to some embodiments. The components of AR/VR datastore 1600 may include data groups used by modules and/or routines, e.g, image data 1605, scene 1610, kinematic model 1615, object 1620, generated image 1625, behavior 1635, 3D map 1640, input-output map 1645, and cue 1650 (to be described more fully below). The data groups used by modules or routines illustrated in FIG. 16 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar.

The components of computer datastore 1600 are discussed further herein in the discussion of other of the Figures. In overview, image data 1605 records may include for example, RGB and depth data in relation to pixels; scene 1610 records may comprise, for example, the location, address, GPS coordinates, imaging orientation, and other identifying information of a location located before a user of proprioception therapy device; kinematic model 1615 records may comprise, for example, a kinematic model of a particular human, such as a user of proprioception device, and/or of a human and/or of an idealized, average, or composite form of a kinematic model of humans across many instances; object 1620 records may comprise objects identified in image data, such as according to segmentation (which records may comprise segments of pixels and the location and depth of such segments and/or an identifier thereof); generated image 1625 records may comprise an image of an unimpaired human body component object or a cue object; behavior 1635 records may comprise a behavior given as an instruction and/or a behavior of a kinematic model; 3D map 1640 records may comprise a 3D map of a scene prepared by a proprioception therapy device; input-output map 1645 records may comprise user control input matched to an output of, for example, an unimpaired human body component object or a prosthesis; cue 1650 records may comprise information of a cue object.

Figure 17:
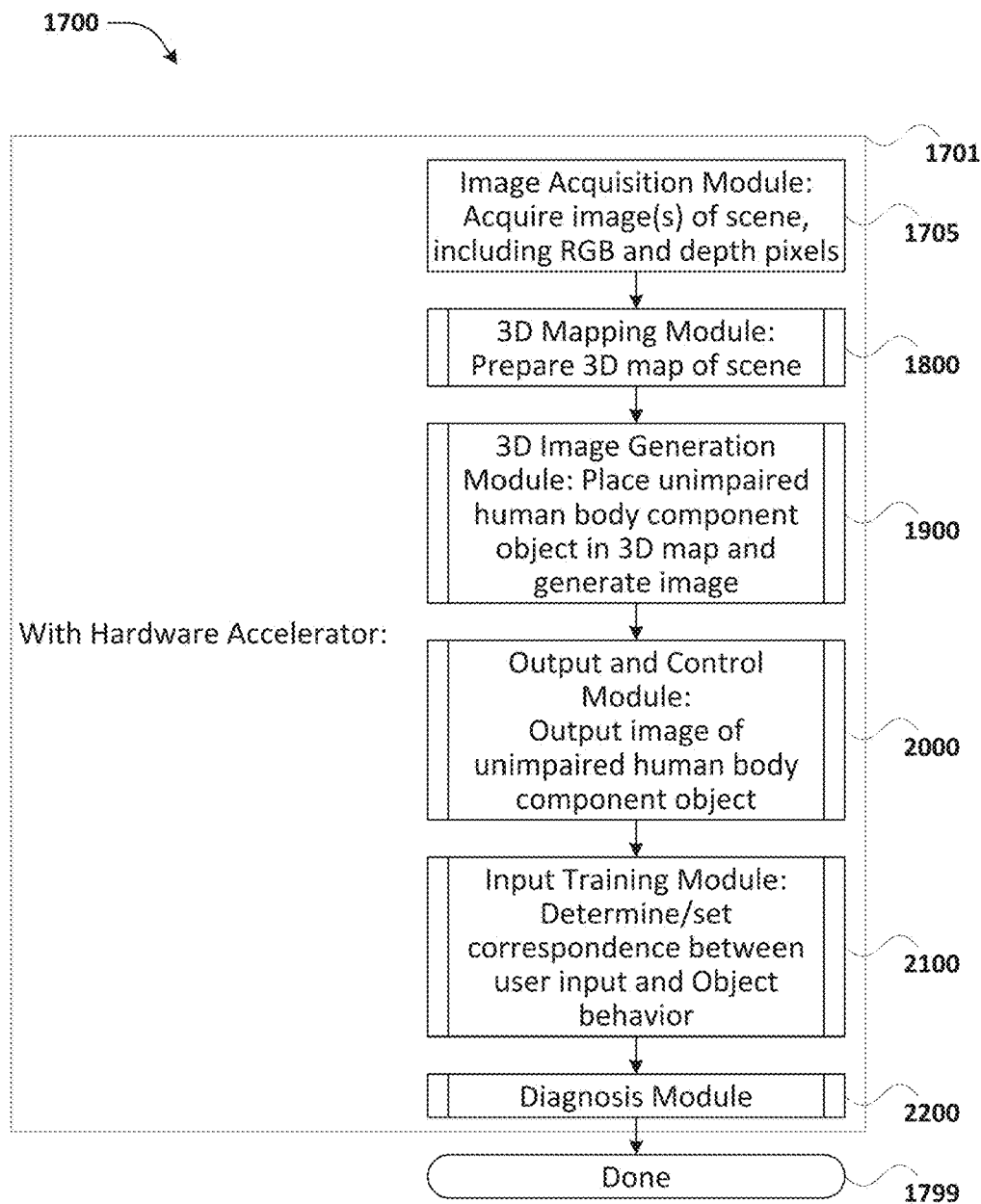
FIG. 17 is a flow diagram illustrating an example of modules which may be performed by proprioception therapy computer device(s), according to some embodiments.

FIG. 17 is a flow diagram illustrating an example of proprioception therapy module 1700 which may be performed by proprioception therapy computer device(s), such as AR/VR computer 1500, according to some embodiments. As indicated at block 1701, these modules may be performed by or with the assistance of a hardware accelerator, such as hardware acceleration module 1510.

At block 1705, proprioception therapy module 1700 may acquire images of a scene, such as from an angle of view of an augmented reality or virtual reality device. The acquired images may comprise, for example, RGB and depth data in relation to pixels. The acquired images may be store in one or more image data 1605 records. The images may be acquired from, for example, an Intel RealSense® camera or a system compatible with the Intel RealSense® platform.

At block 1800, proprioception therapy module 1700 may call or trigger execution of, for example, 3D mapping module 1800 and prepare a 3D map of a scene located before a user of proprioception therapy module 1700 based on, for example, image data 1605 records. The location, address, GPS coordinates, imaging orientation, and other identifying information of the scene located before a user of proprioception therapy module 1700 may be recorded as one or more scene 1610 records. 3D map(s) may be stored as, for example, one or more 3D map 1640 records.

As described further in relation to FIG. 18, image acquisition module 1800 may identify objects in image data 1605, such as according to segmentation. Identified objects may be stored as, for example, one or more object 1620 records. Image acquisition module may identify a position of the objects according to, for example, pixel depth and coordinate data in image data. Image acquisition module 1800 may determine which of object 1620 records comprise objects of a human user of image acquisition module 1800. This may be determined according to, for example, a kinematic model of a human and/or of an idealized, average, or composite form of a kinematic model of a human across many instances.

Image acquisition module 1800 may obtain or determine a diagnosis in relation to a human user of image acquisition module 1800. The diagnosis may be determined by a diagnosis module, such as diagnosis module 2200, described further in relation to FIG. 22, and/or may be provided by external input, such as from a human user of image acquisition module 1800 and/or a medical service provider. The diagnosis may be based on rigid bodies, joints, and kinematic constraints determined in relation to a human user of image acquisition module 1800.

At block 1900, proprioception therapy module 1700 may call or trigger execution of, for example, 3D image generation module 1900, to place an unimpaired human body component object in the 3D map generated at block 1800 and to generate an image thereof.

At block 2000, proprioception therapy module 1700 may call or trigger execution of, for example, output and control module 2000 to output a cue object for proprioception therapy and/or an image of an unimpaired human body component object for proprioception therapy. Output and control module 2000 may also receive user control input and update generated images via 3D image generation module 1900 based on user control input.

At block 2100, proprioception therapy module 1700 may call or trigger execution of, for example, input training module 2100 to determine and/or set a correspondence between user input and object behavior.

At block 2200, proprioception therapy module 1700 may call or trigger execution of, for example, diagnosis module 2200 to diagnose human body components which may be impaired or which do not function according to the function of an idealized kinematic model.

At block 1799, proprioception therapy module 1700 may conclude and/or return to a module and/or another process which may have called it.

FIG. 18 is a flow diagram illustrating an example of a method performed by a 3D mapping module 1800, according to some embodiments.

At block 1805, image acquisition module 1800 may obtain images of a scene, such as a scene before a user. The images may include RGB and depth data in relation to pixels. The depth data may be determined from, for example, stereopsis, structured light, time-of-flight, and coded aperture approaches and/or from a depth camera. The images may be obtained by an augmented reality and/or virtual reality display device which may include one or more cameras. The images may be obtained by an Intel RealSense® camera or a camera compatible with the Intel RealSense® platform. The images may be obtained by, for example, image acquisition module 1505. The images may be stored as, for example, one or more image data 1605 records.

At block 1810, image acquisition module 1800 may identify a set of object(s) in image data 1605. Object may be identified according to, for example, segmentation of pixels in image data 1605. Segmentation may include, for example, identification of segments of pixels according to at least one of a threshold, a cluster, a compression algorithm, a histogram, an edge detection, a region-growth algorithm, a partial differential equation, a graph partition algorithm, a watershed transformation algorithm, a model-based segment algorithm, or a trainable segmentation algorithm, such as a machine learning algorithm.

Identified objects may be stored as, for example, one or more object 1620 records.

At block 1815, image acquisition module 1800 may identify a position of the objects of block 1810 according to, for example, pixel depth and pixel coordinate data in image data 1605 records.

At block 1820, image acquisition module 1800 may determine which of object 1620 records comprise objects of a human user of image acquisition module 1800. This may be determined according to, for example, a kinematic model of a particular human, such as a user of image acquisition module 1800, and/or of a human and/or of an idealized, average, or composite form of a kinematic model of humans across many instances. Such kinematic model may be found in, for example, one or more kinematic model 1615 records. Instructions may be provided to a human user of image acquisition module 1800 to aid in identification of objects of a human user, such as instructions to move components of the human body. Identification of objects of a human user may distinguish between, for example, table 103 and unimpaired human body component 110 in FIG. 1. Identification of objects of a human user may identify rigid bodies and joints. Angle(s) of joint(s), relative to degrees of freedom and/or relative position of rigid bodies may also be determined.

At block 2200, image acquisition module 1800 may optionally obtain or determine a diagnosis in relation to components of a human user. The diagnosis may be determined by a diagnosis module, such as diagnosis module 2200, described further in relation to FIG. 22, and/or may be provided by external input, such as from a human user and/or a medical service provider. The diagnosis may be based on rigid bodies, joints, and kinematic constraints determined in block 1820 and comparison of an observed kinematic model with an ideal kinematic model. The diagnosis may identify an absent or impaired human body component.

At block 1825, image acquisition module 1800 may prepare a 3D map of the scene, including the objects of block 1810 and their positions, of block 1815. The 3D map may identify which objects are of a human, according to block 1802. The 3D map may identify an absent or impaired human body component. The 3D map may be stored in one or more 3D map 1640 records.

At block 1899, image acquisition module 1800 may return, conclude and/or may return to a process which may have spawned or called it.

Figure 19:
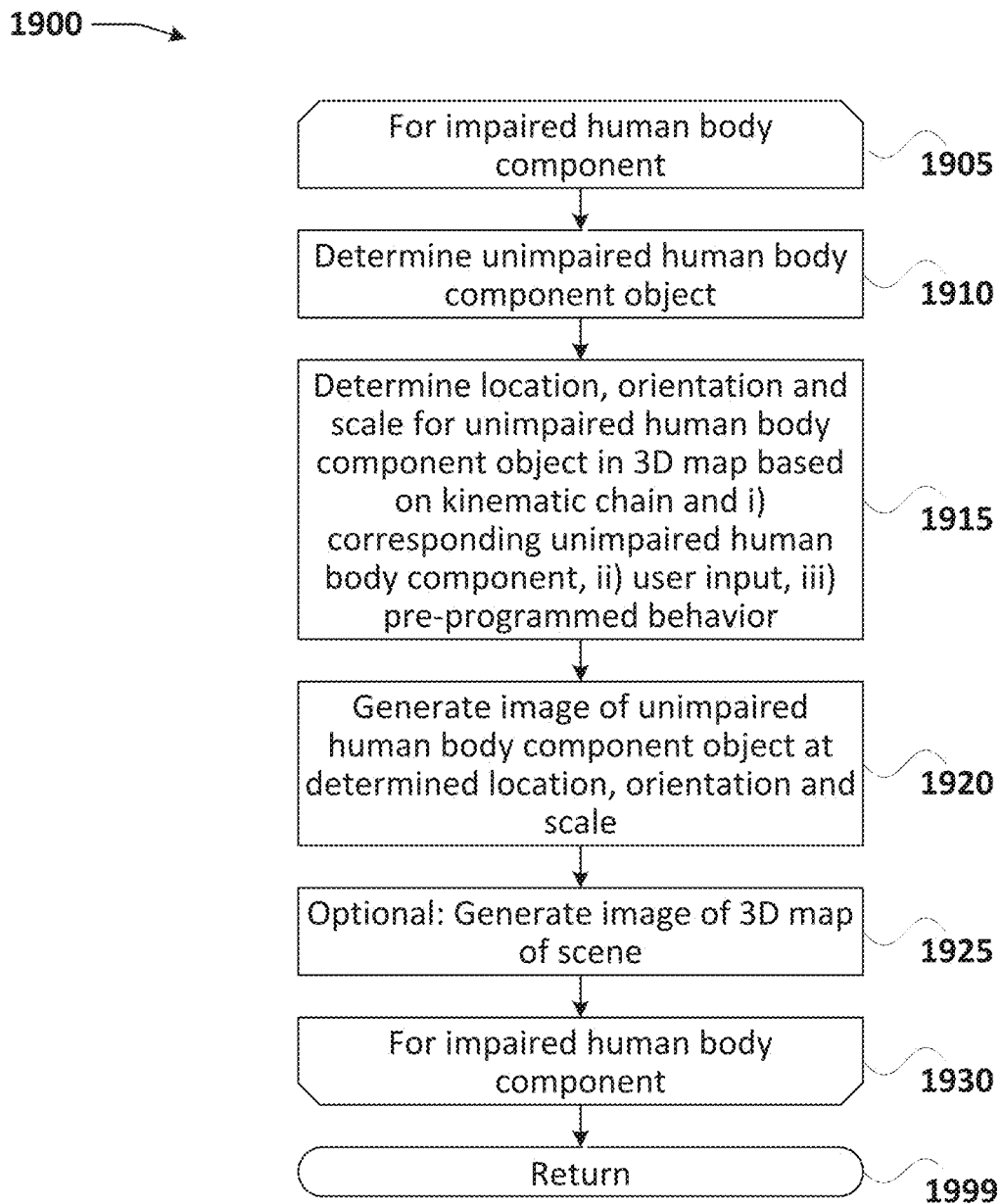
FIG. 19 is a flow diagram illustrating an example of a method performed by a 3D image generation module, according to some embodiments.

FIG. 19 is a flow diagram illustrating an example of a method performed by a 3D image generation module 1900, according to some embodiments.

Opening loop block 1905 to closing loop block 1930 may iterate over or be performed in relation to an impaired human body component, such as one identified in or by diagnosis module 2200.

At block 1910, 3D image generation module 1900 may determine an unimpaired human body component object corresponding to the impaired human body component of opening loop block 1910. The determination may be made by reference to a kinematic model of an unimpaired human body component object corresponding to the impaired human body component and/or the determination may be with reference to a mirror image unimpaired human body component. For example, if a human user of 3D image generation module 1900 had been determined to have lost a limb, a unimpaired human body component object corresponding to the impaired human body component may be an object corresponding to the missing limb, and/or an object corresponding to a mirror image of the non-missing (present) limb.

At block 1915, 3D image generation module 1900 may determine a location, orientation and scale for the unimpaired human body component object in a 3D map, such as a 3D map created by 3D mapping module 1800. The location, orientation and scale may be determined such that an image generated of the unimpaired human body component object, when output in an augmented reality and/or virtual reality output device, will appear to place the image of the unimpaired human body component object in the location of the impaired human body component. "Location, orientation, and scale" may also be referred to herein as a "pose".

At block 1920, 3D image generation module 1900 may generate an image of the unimpaired human body component object at or according to the determined location, orientation and scale (or pose) of block 1915. The generated image may be stored in, for example, one or more generated image 1625 records.

At block 1925, 3D image generation module 1900 may optionally generate image(s) of the 3D map of the scene, for example, if 3D image generation module 1900 is to operate with a virtual reality display device and if such device is to display images of the scene. Such generated image(s) may also be stored in, for example, one or more generated image 1625 records.

At closing loop block 1930, 3D image generation module 1900 may return to opening loop block 1905 to iterate over another impaired human body component, if any.

At block 1999, 3D image generation module 1900 may conclude and/or return to another module and/or another process which may have spawned or called it.

Figure 20:
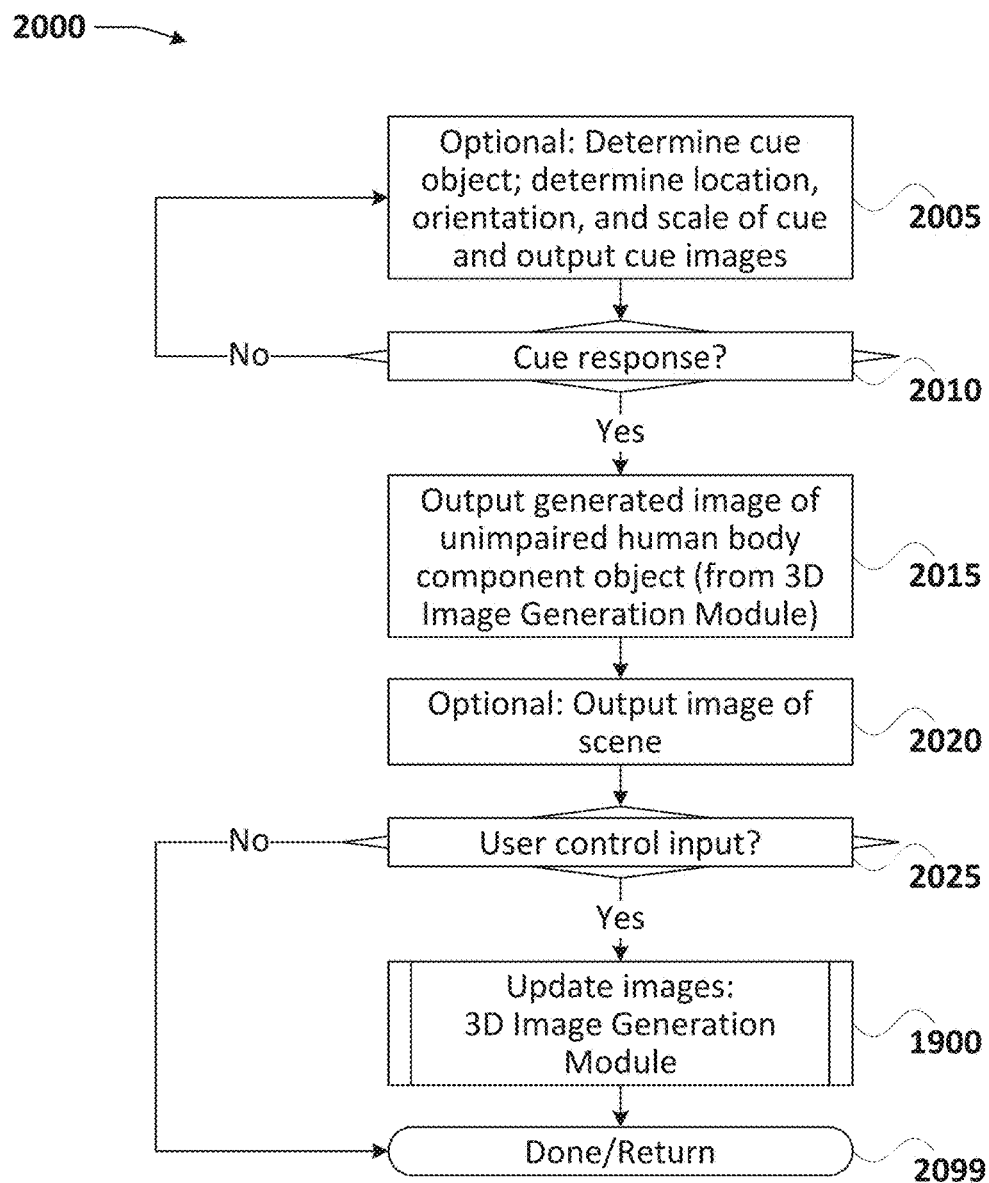
FIG. 20 is a flow diagram illustrating an example of a method performed by an output and control module, according to some embodiments.

FIG. 20 is a flow diagram illustrating an example of a method performed by an output and control module 2000, according to some embodiments.

At block 2005, output and control module 2000 may, if a then-current proprioception therapy session is to involve a cue, determine a cue object and its location, orientation, and scale (or pose), which may be relative to an augmented reality and/or virtual reality display device of a human user of output and control module 2000. Please see, for example, the discussion of FIGS. 1-8, in which a cue object is determined and output.

At decision block 2010, output and control module 2000 may determine, if required, whether a response to the cue object is received, such as in user input. If negative or equivalent at decision block 2010, then output and control module 2000 may return to block 2005.

If affirmative or equivalent at decision block 2010, or if blocks 2005 and 2010 were not performed, at block 2015, output and control module 2000 may output a generated image of an unimpaired human body component object, as may have been produced by, for example, 3D image generation module 1900 and as may be found in one or more generated image 1625 records. Output may be to, for example, an augmented reality and/or virtual reality display device.

At block 2020, output and control module 2000 may optionally output a generated image of the scene, as may have been produced by, for example, 3D image generation module 1900 and as may be found in one or more generated image 1625 records. Output may be to, for example, an augmented reality and/or virtual reality display device.

At decision block 2025, output and control module 2000 may determine whether a user control of the unimpaired human body component object is received. Such a control input may be, for example, a text, voice, gesture or other input. Such a control input may be a movement of a mirror symmetric human body component. Such a control input may be, for example, a movement of human body components proximate to the impaired human body component. Such a control input may be from a muscular-skeletal nervous system sensor. Control input may be matched to an output according to, for example, one or more input-output map 1645 record, as may have been established by, for example, input training module 2100.

At block 1900, output and control module 2000 may update generated images of the unimpaired human body component object, such as by calling 3D image generation module 1900.

At block 2099, output and control module 2000 may return to, for example, block 2015, and/or may conclude and/or return to a process which may have called output and control module 2000.

Figure 21:
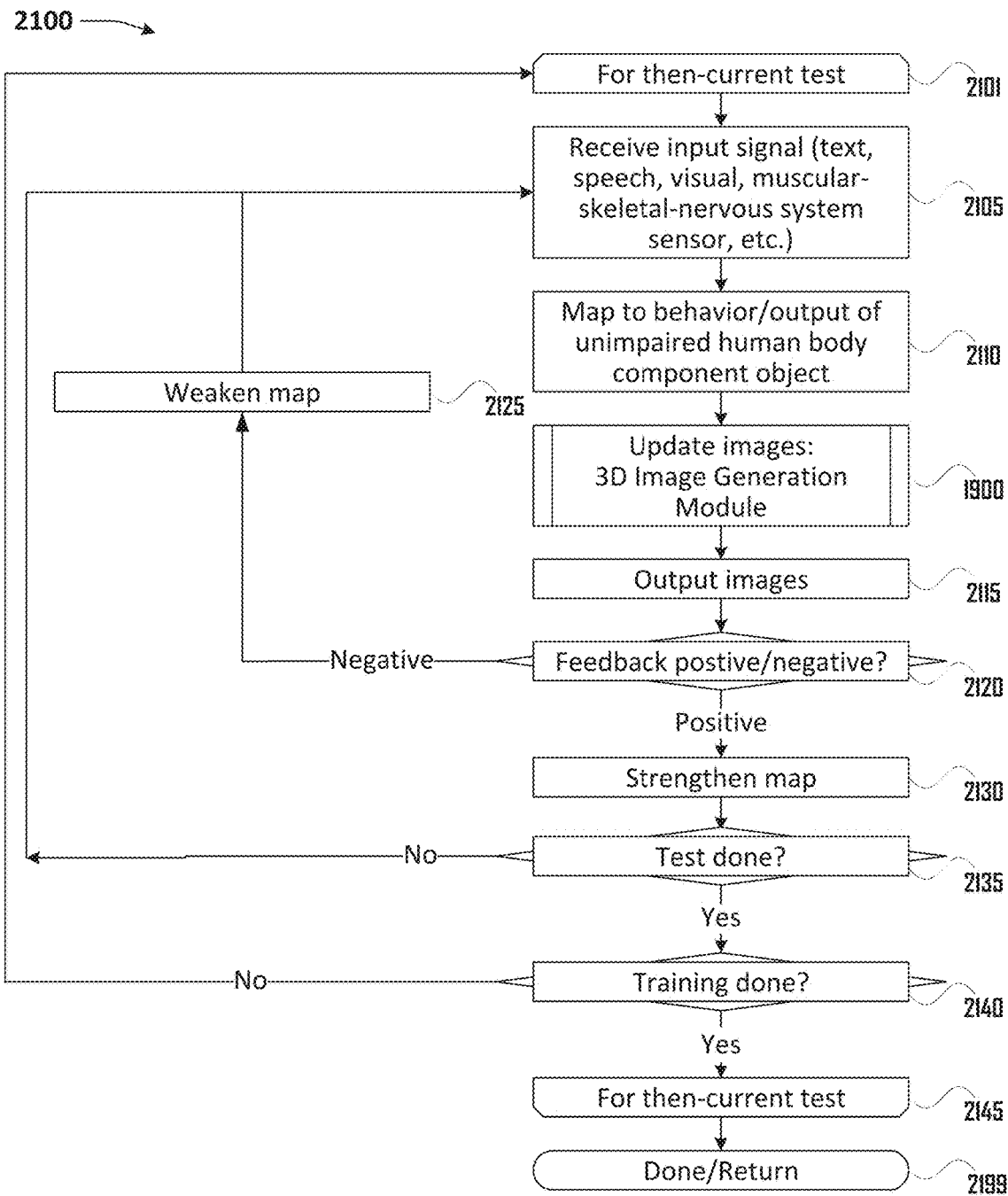
FIG. 21 is a flow diagram illustrating an example of a method performed by an input training module, according to some embodiments.

FIG. 21 is a flow diagram illustrating an example of a method performed by an input training module 2100, according to some embodiments, wherein the correspondence is determined by at least one of a test of a signal to or from the absent or impaired HBC, a test of a corresponding signal to a corresponding mirror image unimpaired HBC relative to the absent or impaired HBC, or a retraining of the human user.

Opening loop block 2101 to closing loop block 2145 may iterate over a then-current test, such as a test of a signal to or from the absent or impaired HBC, a test of a corresponding signal to a corresponding mirror image unimpaired HBC relative to the absent or impaired HBC. test may be designed to retrain the human user.

At block 2105, input training module 2100 may receive an input signal from a user of input training module 2100. The input signal may include, for example, one of text, speech, visual (including gesture), and/or muscular-skeletal-nervous system sensor input.

At block 2110, input training module 2100 may map the input signal to a behavior or output of an unimpaired human body component object. The mapping may be based on a default mapping and/or on a mapping determined during a previous iteration of input training module 2100. Mapping between input and output may be stored as, for example, one or more input-output map 1645 record.

At block 1900, input training module 2100 may update images for an unimpaired human body component object, such as by calling 3D image generation module 1900.

At block 2115, input training module 2100 may output the images of block 1900.

At decision block 2120, input training module 2100 may determine whether positive or negative feedback was received from a user of input training module 2100, from another party in relation to the output images of block 2115, or from an analysis of images of the user responding to the test, such as a kinematic synthesis. If negative or equivalent at decision block 2120, input training module 2100 may, at block 2125, weaken an association between the input and the output in input-output map 1645 record. If affirmative or equivalent at decision block 2120, input training module 2100 may, at block 2130, strengthen an association between the input and the output in input-output map 1645 record.

At decision block 2135, input training module 2100 may determine if the then-current test is done. If negative or equivalent, input training module 2100 may return to block 2105.

If affirmative or equivalent at decision block 2140, input training module 2100 may determine if training is done. If negative or equivalent, input training module 2100 may return to opening loop block 2101 and select a next test as part of the training. If affirmative or equivalent at block 2140, input training module 2100 may conclude iterating over tests of the training and may continue to block 2199.

At block 2199, input training module 2100 may return, conclude, and/or may return to another process which may have called it.

Figure 22:
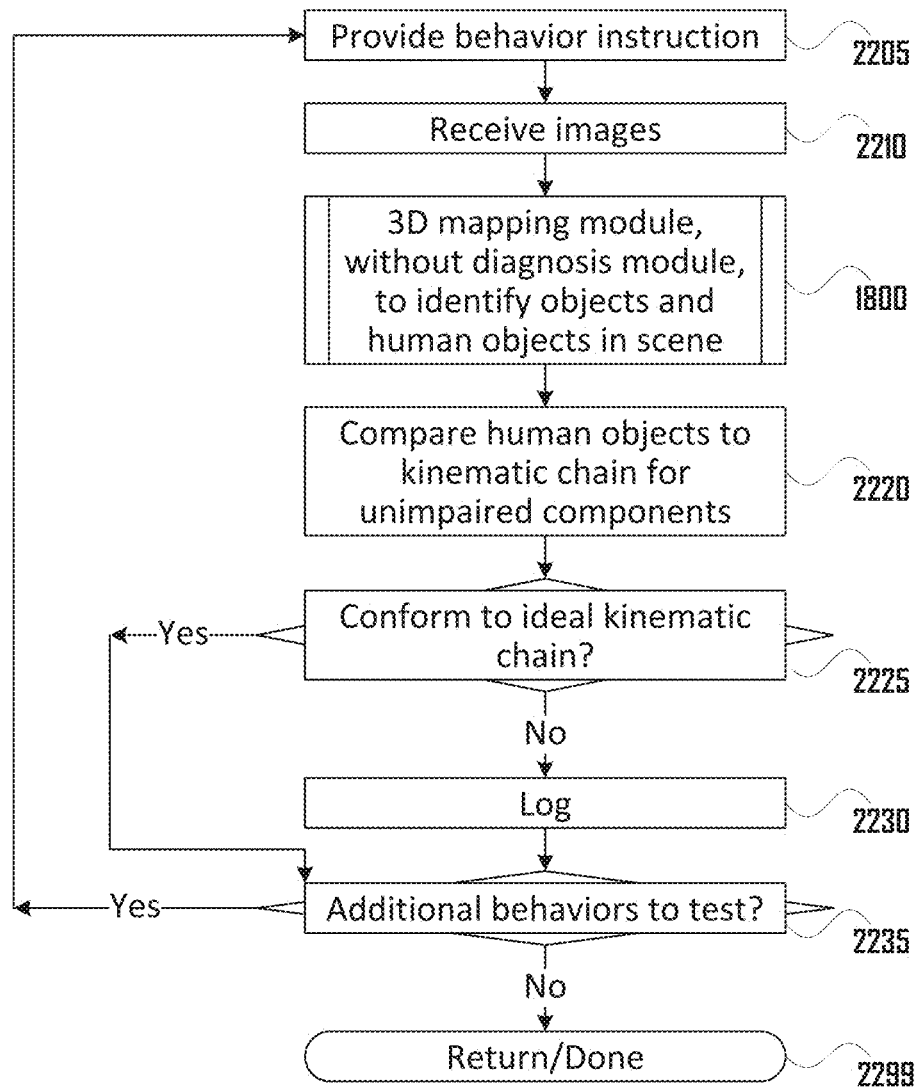
FIG. 22 is a flow diagram illustrating an example of a method performed by a diagnosis module, according to some embodiments.

FIG. 22 is a flow diagram illustrating an example of a method performed by a diagnosis module 2200, according to some embodiments.

At block 2205, diagnosis module 2200 may optionally provide a behavior instruction to a user of diagnosis module 2200. The behavior instruction may include an instruction to move a human body component, an instruction to manipulate an object, or the like. The instruction may be provided in conjunction with images, output to an augmented reality and/or virtual reality output device with images illustrating a desired behavior.

At block 2210, diagnosis module 2200 may obtain images of the user of diagnosis module 2200. The image may be obtained from, for example, 3D mapping module 1800, image acquisition module 1505, or the like. The images may be captured by an output device, including an augmented reality and/or virtual reality output device, a separate camera with a view of the user, and the like. The images may have been obtained following the behavior instruction of block 2205, and/or may be obtained from 3D mapping module 1800.

If necessary, such as if additional images were obtained following a behavior instruction of block 2205, diagnosis module may call or execute 3D mapping module 1800 or otherwise may identify objects in the scene, such as according to segmentation, and may identify human body components in the scene.

At block 2220, diagnosis module 2200 may compare the human objects identified in or of block 1800 to a kinematic chain for corresponding unimpaired human body components. This comparison may involve performance of kinematic synthesis relative to the human objects of block 1800 to prepare a kinematic model of the human objects, and comparison of the resulting kinematic model to an ideal, average, typical, etc., kinematic model.

At block 2225, diagnosis module 2200 may determine whether the prepared kinematic model of the human objects conforms to or deviates from the ideal, average, typical, etc., kinematic model.

If negative or equivalent at block 2225, at block 2230 diagnosis module 2200 may log the result, for example, to allow proprioception therapy module 1700 to identify that it is to select an unimpaired human body component object corresponding to the logged result. If affirmative or equivalent at block 2225, diagnosis module 2200 may log the result and/or may proceed to block 2235.

At block 2235, diagnosis module 2200 may determine whether there are additional behaviors to test. If affirmative or equivalent at block 2235, diagnosis module 2200 may return to block 2205 to provide a behavior instruction or to otherwise iterate the foregoing blocks over an additional behavior. If negative or equivalent at block 2235, diagnosis module 2200 may proceed to block 2299.

At block 2299, diagnosis module 2200 may conclude, return, and/or return to a process which may have called it.

AR/VR computer 1500, except for the teachings of the present disclosure, may include, but is not limited to, an augmented reality output device, a virtual reality output device and/or supporting computers therefore, a server, a workstation computer, a desktop computer, a laptop computer, a tablet computer (e.g., iPad®, GalaxyTab® and the like), an ultraportable computer, an ultramobile computer, a netbook computer and/or a subnotebook computer; a mobile telephone including, but not limited to a smart phone, (e.g., iPhone®, Android®-based phone, Blackberry®, Symbian®-based phone, Palm®-based phone, etc.) and/or a feature phone.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions. USB (Universal serial bus) may comply or be compatible with Universal Serial Bus Specification, Revision 2.0, published by the Universal Serial Bus organization, Apr. 27, 2000, and/or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and/or later and/or related versions of this specification.

As used in any embodiment herein, the term "logic" may refer to the logic of the instructions of an app, software, and/or firmware, and/or the logic embodied into a programmable circuitry by a configuration bit stream, to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as FPGA. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Following are examples:

EXAMPLE 1

An apparatus for proprioception training, comprising: a computer processor and a memory; and a 3-dimensional ("3D") mapping module to prepare a 3D map of a scene, wherein to prepare the 3D map of the scene, the 3D mapping module is to obtain an image of the scene, identify a set of objects in the image and their position in a 3D space, identify an absent or impaired human body component ("HBC") object in the set of objects, and prepare the 3D map of the scene comprising the set of objects in the 3D space; a 3D image generation module to place an unimpaired HBC object in the 3D map, wherein to place the unimpaired HBC object in the 3D map, the 3D image generation module is to determine the unimpaired HBC object, determine a pose for the unimpaired HBC object in the 3D map, and generate an image of the unimpaired HBC object at the determined pose; an output module to output the image of the unimpaired HBC object; and a hardware accelerator to accelerate performance of at least one of the modules, wherein to accelerate performance, the hardware accelerator is to at least accelerate the identification of the set of objects in the 3D space.

EXAMPLE 2

The apparatus according to Example 1, wherein the output module is to output the image of the unimpaired HBC object in one of an augmented reality display and a virtual reality display.

EXAMPLE 3

The apparatus according to Example 2, wherein the output module is to output the image of the unimpaired HBC object in the virtual reality display and is to output the image of the unimpaired HBC object in conjunction with an output of an image of the 3D map.

EXAMPLE 4

The apparatus according to Example 2, wherein the output module is to output the image of the unimpaired HBC object in the augmented reality display as an overlay.

EXAMPLE 5

The apparatus according to Example 1, wherein identify the absent or impaired HBC object in the set of objects further comprises at least one of receive an identification of the absent or impaired HBC object or compare at least a subset of the set of objects in the image to a kinematic chain for an unimpaired human body and identify, by way of the comparison, the absent or impaired HBC object.

EXAMPLE 6

The apparatus according to Example 1, wherein the image is a first image and wherein to prepare the 3D map of the scene, the 3D mapping module is further to instruct a human user to engage in a movement, receive the first and a second image, and compare at least a subset of the set of objects in the first and second images to a kinematic chain for an unimpaired human body and identify, in the comparison, the absent or impaired HBC object.

EXAMPLE 7

The apparatus according to Example 1, further comprising an image acquisition module to acquire the image of the scene, wherein to acquire the image of the scene, the image acquisition module is to image RGB values and depth values for a set of pixels in the image.

EXAMPLE 8

The apparatus according to Example 7, wherein the 3D mapping module is to segment the set of pixels into a set of segments and identify the set of objects in the image according to the set of segments.

EXAMPLE 9

The apparatus according to Example 8, wherein to segment comprises identify the set of segments according to at least one of a threshold, a cluster, a compression algorithm, a histogram, an edge detection, a region-growth algorithm, a partial differential equation, a graph partition algorithm, a watershed transformation algorithm, a model-based segment algorithm, or a trainable segmentation algorithm.

EXAMPLE 10

The apparatus according to Example 7, wherein the apparatus comprises a depth sensor.

EXAMPLE 11

The apparatus according to Example 10, wherein the depth sensor comprises at least one of a stereopsis module, a structured light source and sensor thereof, a time-of-flight module, and a coded aperture module.

EXAMPLE 12

The apparatus according to Example 1, wherein to generate the unimpaired HBC object comprises to generate the unimpaired HBC object based on at least one of a corresponding mirror image unimpaired HBC relative to the absent or impaired HBC or a kinematic model of the unimpaired HBC object.

EXAMPLE 13

The apparatus according to Example 1, wherein to generate the unimpaired HBC object comprises to determine a behavior of the unimpaired HBC object and determine the pose for the unimpaired HBC object in the 3D map over a time period according to the behavior.

EXAMPLE 14

The apparatus according to Example 13, wherein the 3D image generation module is to generate a cue for the behavior, wherein the cue comprises at least one of a visual or auditory indicator to a human to engage in the behavior.

EXAMPLE 15

The apparatus according to Example 14, wherein the output module is further to output the cue.

EXAMPLE 16

The apparatus according to Example 13, wherein the cue comprises at least one of a virtual object or an instruction to engage in the behavior with a corresponding mirror image unimpaired HBC relative to the absent or impaired HBC.

EXAMPLE 17

The apparatus according to Example 13, wherein the behavior conforms to a kinematic chain for an unimpaired human body.

EXAMPLE 18

The apparatus according to Example 1, further comprising a muscular-skeletal-nervous system sensor module to determine a user input, wherein to determine the user input, the muscular-skeletal-nervous system sensor module is to receive a signal from a human user and interpret the signal as the user input according to a correspondence between the signal and an action of an unimpaired human body.

EXAMPLE 19

The apparatus according to Example 18, wherein the correspondence is determined by at least one of a test of a signal to or from the absent or impaired HBC, a test of a corresponding signal to a corresponding mirror image unimpaired HBC relative to the absent or impaired HBC, or a retraining of the human user.

EXAMPLE 20

The apparatus according to Example 18, wherein the muscular-skeletal-nervous system sensor module comprises at least one of a muscle activity sensor, a nervous system activity sensor, a motor cortex sensor, or a sensory cortex sensor.

EXAMPLE 21

The apparatus according to Example 18, wherein the 3D image generation module is to further to determine the pose for the unimpaired HBC object in the 3D map over a time period according to the input.

EXAMPLE 22

The apparatus according to Example 1, wherein the 3D space is defined relative to a perspective of the apparatus.

EXAMPLE 23

The apparatus according to Example 1, wherein the output module is to generate the image of the unimpaired HBC object according to the 3D map and a perspective of the apparatus.

EXAMPLE 24

A computer implemented method for proprioception therapy, comprising: preparing a 3-dimensional ("3D") map of a scene by obtaining an image of the scene, identifying a set of objects in the image and their position in a 3D space, identifying an absent or impaired human body component ("HBC") object in the set of objects, and preparing the 3D map of the scene comprising the set of objects in the 3D space; placing an unimpaired HBC object in the 3D map by determining the unimpaired HBC object to place, determining a pose for the unimpaired HBC object in the 3D map, and generating an image of the unimpaired HBC object at the determined pose; and outputting the image of the unimpaired HBC object.

EXAMPLE 25

The method according to Example 24, wherein outputting the image of the unimpaired HBC object comprises outputting to at least one of an augmented reality display and a virtual reality display.

EXAMPLE 26

The method according to Example 25, further comprising outputting the image of the unimpaired HBC object in the virtual reality display in conjunction with an output of an image of the 3D map.

EXAMPLE 27

The method according to Example 25, further comprising outputting the image of the unimpaired HBC object in the augmented reality display as an overlay.

EXAMPLE 28

The method according to Example 24, wherein identifying the absent or impaired HBC object in the set of objects further comprises at least one of receiving an identification of the absent or impaired HBC object or comparing at least a subset of the set of objects in the image to a kinematic chain for an unimpaired human body and identify, by way of the comparison, the absent or impaired HBC object.

EXAMPLE 29

The method according to Example 24, wherein the image is a first image and wherein preparing the 3D map of the scene further comprises instructing a human user to engage in a movement, receiving the first and a second image, and comparing at least a subset of the set of objects in the first and second images to a kinematic chain for an unimpaired human body and identifying, in the comparison, the absent or impaired HBC object.

EXAMPLE 30

The method according to Example 24, further comprising acquiring the image of the scene by imaging RGB values and depth values for a set of pixels in the image.

EXAMPLE 31

The method according to Example 30, further comprising segmenting the set of pixels into a set of segments and identifying the set of objects in the image according to the set of segments.

EXAMPLE 32

The method according to Example 31, wherein segmenting comprises identifying the set of segments according to at least one of a threshold, a cluster, a compression algorithm, a histogram, an edge detection, a region-growth algorithm, a partial differential equation, a graph partition algorithm, a watershed transformation algorithm, a model-based segment algorithm, or a trainable segmentation algorithm.

EXAMPLE 33

The method according to Example 30, further comprising obtaining the depth values from a depth sensor.

EXAMPLE 34

The method according to Example 33, wherein the depth sensor comprises at least one of a stereopsis module, a structured light source and sensor thereof, a time-of-flight module, and a coded aperture module.

EXAMPLE 35

The method according to Example 24, wherein generating the unimpaired HBC object comprises generating the unimpaired HBC object based on at least one of a corresponding mirror image unimpaired HBC relative to the absent or impaired HBC or a kinematic model of the unimpaired HBC object.

EXAMPLE 36

The method according to Example 24, wherein generating the unimpaired HBC object comprises determining a behavior of the unimpaired HBC object and determining the pose for the unimpaired HBC object in the 3D map over a time period according to the behavior.

EXAMPLE 37

The method according to Example 36, further comprising generating a cue for the behavior, wherein the cue comprises at least one of a visual or auditory indicator to a human to engage in the behavior.

EXAMPLE 38

The method according to Example 37, further comprising outputting the cue.

EXAMPLE 39

The method according to Example 36, wherein the cue comprises at least one of a virtual object or an instruction to engage in the behavior with a corresponding mirror image unimpaired HBC relative to the absent or impaired HBC.

EXAMPLE 40

The method according to Example 36, wherein the behavior conforms to a kinematic chain for an unimpaired human body.

EXAMPLE 41

The method according to Example 24, further comprising receiving a signal from a muscular-skeletal-nervous system sensor and interpreting the signal as the user input according to a correspondence between the signal and an action of an unimpaired HBC.

EXAMPLE 42

The method according to Example 41, wherein the correspondence is determined by at least one of a test of a signal to or from the absent or impaired HBC, a test of a corresponding signal to a corresponding mirror image unimpaired HBC relative to the absent or impaired HBC, or a retraining of the human user.

EXAMPLE 43

The method according to Example 41, wherein the muscular-skeletal-nervous system sensor comprises at least one of a muscle activity sensor, a nervous system activity sensor, a motor cortex sensor, or a sensory cortex sensor.

EXAMPLE 44

The method according to Example 41, further comprising determining the pose for the unimpaired HBC object in the 3D map over a time period according to the input.

EXAMPLE 45

The method according to Example 24, further comprising defining the 3D space relative to a perspective of a wearer of an augmented reality or virtual reality output device.

EXAMPLE 46

The method according to Example 24, further comprising generating the image of the unimpaired HBC object according to the 3D map and a perspective of a wearer of an augmented reality or virtual reality output device.

EXAMPLE 47

The method according to Example 24, further comprising performing at least identification of the set of objects in the 3D space with a hardware accelerator.

EXAMPLE 48

A computer apparatus for proprioception therapy, comprising: means to prepare a 3D map of a scene comprising means to obtain an image of the scene, identify a set of objects in the image and their position in a 3D space, identify an absent or impaired human body component ("HBC") object in the set of objects, and prepare the 3D map of the scene comprising the set of objects in the 3D space; means to place an unimpaired HBC object in the 3D map comprising means to determine the unimpaired HBC object, determine a pose for the unimpaired HBC object in the 3D map, and generate an image of the unimpaired HBC object at the determined pose; and means to output the image of the unimpaired HBC object.

EXAMPLE 49

The apparatus according to Example 48, further comprising means to output the image of the unimpaired HBC object in one of an augmented reality display and a virtual reality display.

EXAMPLE 50

The apparatus according to Example 49, further comprising means to output the image of the unimpaired HBC object in conjunction with an output of an image of the 3D map.

EXAMPLE 51

The apparatus according to Example 49, further comprising means to output the image of the unimpaired HBC object in the augmented reality display as an overlay.

EXAMPLE 52

The apparatus according to Example 48, wherein means to identify the absent or impaired HBC object in the set of objects further comprises means to receive an identification of the absent or impaired HBC object or means to compare at least a subset of the set of objects in the image to a kinematic chain for an unimpaired human body and means to identify, by way of the comparison, the absent or impaired HBC object.

EXAMPLE 53

The apparatus according to Example 48, wherein the image is a first image and wherein means to prepare the 3D map of the scene further comprising means to instruct a human user to engage in a movement, means to receive the first and a second image, and means to compare at least a subset of the set of objects in the first and second images to a kinematic chain for an unimpaired human body and identify, in the comparison, the absent or impaired HBC object.

EXAMPLE 54

The apparatus according to Example 48, further comprising means to acquire the image of the scene comprising means to image RGB values and depth values for a set of pixels in the image.

EXAMPLE 55

The apparatus according to Example 54, further comprising means to segment the set of pixels into a set of segments and means to identify the set of objects in the image according to the set of segments.

EXAMPLE 56

The apparatus according to Example 55, wherein means to segment comprises means to identify the set of segments according to at least one of a threshold, a cluster, a compression algorithm, a histogram, an edge detection, a region-growth algorithm, a partial differential equation, a graph partition algorithm, a watershed transformation algorithm, a model-based segment algorithm, or a trainable segmentation algorithm.

EXAMPLE 57

The apparatus according to Example 54, wherein the apparatus comprises a depth sensor.

EXAMPLE 58

The apparatus according to Example 57, wherein the depth sensor comprises at least one of means to perform stereopsis, means to determine depth with a structured light source and sensor thereof, means to determine depth with time-of-flight analysis, and means to determine depth with a coded aperture.

EXAMPLE 59

The apparatus according to Example 48, wherein means to generate the unimpaired HBC object comprises means to generate the unimpaired HBC object based on at least one of a corresponding mirror image unimpaired HBC relative to the absent or impaired HBC or a kinematic model of the unimpaired HBC object.

EXAMPLE 60

The apparatus according to Example 48, wherein means to generate the unimpaired HBC object comprises means to determine a behavior of the unimpaired HBC object and determine the pose for the unimpaired HBC object in the 3D map over a time period according to the behavior.

EXAMPLE 61

The apparatus according to Example 60, further comprising means to generate a cue for the behavior, wherein the cue comprises at least one of a visual or auditory indicator to a human to engage in the behavior.

EXAMPLE 62

The apparatus according to Example 61, further comprising means to output the cue.

EXAMPLE 63

The apparatus according to Example 60, wherein means to output the cue comprises means to output at least one of a virtual object or an instruction to engage in the behavior with a corresponding mirror image unimpaired HBC, relative to the absent or impaired HBC.

EXAMPLE 64

The apparatus according to Example 60, wherein the behavior conforms to a kinematic chain for an unimpaired human body.

EXAMPLE 65

The apparatus according to Example 48, further comprising means to obtain a signal from a muscular-skeletal-nervous system sensor and means to determine the user input in the signal according to a correspondence between the signal and an action of an unimpaired human body.

EXAMPLE 66

The apparatus according to Example 65, further comprising means to determine the correspondence according to at least one of a test of a signal to or from the absent or impaired HBC, a test of a corresponding signal to a corresponding mirror image unimpaired HBC relative to the absent or impaired HBC, or a retraining of the human user.

EXAMPLE 67

The apparatus according to Example 65, wherein the muscular-skeletal-nervous system sensor comprises means to sense at least one of a muscle activity, a nervous system activity, a motor cortex activity, or a sensory cortex activity.

EXAMPLE 68

The apparatus according to Example 65, further comprising means to determine the pose for the unimpaired HBC object in the 3D map over a time period according to the input.

EXAMPLE 69

The apparatus according to Example 48, further comprising means to define the 3D space relative to a perspective of an augmented reality or virtual reality output device.

EXAMPLE 70

The apparatus according to Example 48 wherein the means to identify the set of objects in the 3D space comprises means to identify the set of objects in the 3D space with a hardware accelerator.

EXAMPLE 71

One or more computer-readable media comprising instructions that cause a computer device, in response to execution of the instructions by a processor of the computer device, to: obtain an image of the scene, identify a set of objects in the image and their position in a 3D space, identify an absent or impaired human body component ("HBC") object in the set of objects, and prepare a 3D map of the scene comprising the set of objects in the 3D space; place an unimpaired HBC object in the 3D map, wherein to place the unimpaired HBC object in the 3D map comprises to determine the unimpaired HBC object, determine a pose for the unimpaired HBC object and place the unimpaired HBC object in the 3D map, and generate an image of the unimpaired HBC object at the determined pose; and output the image of the unimpaired HBC object.

EXAMPLE 72

The computer-readable media according to Example 71, wherein the computer device is further caused to output the image of the unimpaired HBC object in one of an augmented reality display and a virtual reality display.

EXAMPLE 73

The computer-readable media according to Example 72, wherein the computer device is further caused to output the image of the unimpaired HBC object in conjunction with an output of an image of the 3D map.

EXAMPLE 74

The computer-readable media according to Example 72, further comprising means to output the image of the unimpaired HBC object in the augmented reality display as an overlay.

EXAMPLE 75

The computer-readable media according to Example 71, wherein the computer device is further caused to receive an identification of the absent or impaired HBC object or compare at least a subset of the set of objects in the image to a kinematic chain for an unimpaired human body and identify, by way of the comparison, the absent or impaired HBC object.

EXAMPLE 76

The computer-readable media according to Example 71, wherein the image is a first image and wherein the computer device is further caused to instruct a human user to engage in a movement, receive the first and a second image, and compare at least a subset of the set of objects in the first and second images to a kinematic chain for an unimpaired human body and identify, in the comparison, the absent or impaired HBC object.

EXAMPLE 77

The computer-readable media according to Example 71, wherein the computer device is further caused to image RGB values and depth values for a set of pixels in the image.

EXAMPLE 78

The computer-readable media according to Example 77, wherein the computer device is further caused to segment the set of pixels into a set of segments and identify the set of objects in the image according to the set of segments.

EXAMPLE 79

The computer-readable media according to Example 78, wherein segment comprises identify the set of segments according to at least one of a threshold, a cluster, a compression algorithm, a histogram, an edge detection, a region-growth algorithm, a partial differential equation, a graph partition algorithm, a watershed transformation algorithm, a model-based segment algorithm, or a trainable segmentation algorithm.

EXAMPLE 80

The computer-readable media according to Example 77, wherein the computer device comprises a depth sensor.

EXAMPLE 81

The computer-readable media according to Example 80, wherein the depth sensor comprises at least one of a stereopsis sensor, a structured light source and sensor thereof, a coded aperture sensor, and a time-of-flight sensor.

EXAMPLE 82

The computer-readable media according to Example 71, wherein the computer device is further caused to generate the unimpaired HBC object based on at least one of a corresponding mirror image unimpaired HBC relative to the absent or impaired HBC or a kinematic model of the unimpaired HBC object.

EXAMPLE 83

The computer-readable media according to Example 71, wherein the computer device is further caused to determine a behavior of the unimpaired HBC object and determine the pose for the unimpaired HBC object in the 3D map over a time period according to the behavior.

EXAMPLE 84

The computer-readable media according to Example 83, wherein the computer device is further caused to generate a cue for the behavior, wherein the cue comprises at least one of a visual or auditory indicator to a human to engage in the behavior.

EXAMPLE 85

The computer-readable media according to Example 84, wherein the computer device is further caused to output the cue.

EXAMPLE 86

The computer-readable media according to Example 85, wherein the cue comprises at least one of a virtual object or an instruction to engage in the behavior with a corresponding mirror image unimpaired HBC, relative to the absent or impaired HBC.

EXAMPLE 87

The computer-readable media according to Example 85, wherein the behavior conforms to a kinematic chain for an unimpaired human body.

EXAMPLE 88

The computer-readable media according to Example 71, wherein the computer device is further caused to obtain a signal from a muscular-skeletal-nervous system sensor and determine the user input in the signal according to a correspondence between the signal and an action of an unimpaired human body.

EXAMPLE 89

The computer-readable media according to Example 88, further comprising means to determine the correspondence according to at least one of a test of a signal to or from the absent or impaired HBC, a test of a corresponding signal to a corresponding mirror image unimpaired HBC relative to the absent or impaired HBC, or a retraining of the human user.

EXAMPLE 90

The computer-readable media according to Example 88, wherein the computer device is further caused to, with the muscular-skeletal-nervous system sensor, sense at least one of a muscle activity, a nervous system activity, a motor cortex activity, or a sensory cortex activity.

EXAMPLE 91

The computer-readable media according to Example 88, wherein the computer device is further caused to determine the pose for the unimpaired HBC object in the 3D map over a time period according to the input.

EXAMPLE 92

The computer-readable media according to Example 71, further comprising means to define the 3D space relative to a perspective of an augmented reality or virtual reality output device.

EXAMPLE 93

The computer-readable media according to Example 71 wherein the computer device is further caused to identify the set of objects in the 3D space with a hardware accelerator.

EXAMPLE 94

An system for proprioception training, comprising: a computer processor unit, a memory, and an output device; wherein the computer processor unit is to prepare a 3D map of a scene, wherein to prepare the 3D map of the scene, the computer processor unit is to obtain an image of the scene, identify a set of objects in the image and their position in a 3D space, identify an absent or impaired human body component ("HBC") object in the set of objects, and prepare the 3D map of the scene comprising the set of objects in the 3D space; the computer processor unit is to place an unimpaired HBC object in the 3D map, wherein to place the unimpaired HBC object in the 3D map, the computer processor unit is to determine the unimpaired HBC object, determine a pose for the unimpaired HBC object in the 3D map, and generate an image of the unimpaired HBC object at the determined pose; the computer processor unit is to output the image of the unimpaired HBC object in the output device; and wherein the computer processor unit comprises a hardware accelerator to at least accelerate the identification of the set of objects in the 3D space.

EXAMPLE 95

The system according to Example 94, wherein the output device is one of an augmented reality display and a virtual reality display.

EXAMPLE 96

The system according to Example 95, wherein the virtual reality display is to output the image of the unimpaired HBC object in conjunction with an output of an image of the 3D map.

EXAMPLE 97

The system according to Example 95, wherein the augmented reality display is to output the image of the unimpaired HBC object as an overlay.

EXAMPLE 98

The system according to Example 94, wherein identify the absent or impaired HBC object in the set of objects further comprises at least one of receive an identification of the absent or impaired HBC object or compare at least a subset of the set of objects in the image to a kinematic chain for an unimpaired human body and identify, by way of the comparison, the absent or impaired HBC object.

EXAMPLE 99

The system according to Example 94, wherein the image is a first image and wherein to prepare the 3D map of the scene, the computer processor unit is further to instruct a human user to engage in a movement, receive the first and a second image, and compare at least a subset of the set of objects in the first and second images to a kinematic chain for an unimpaired human body and identify, in the comparison, the absent or impaired HBC object.

EXAMPLE 100

The system according to Example 94, wherein the computer processor unit is to acquire the image of the scene, wherein to acquire the image of the scene, the computer processor unit is to image RGB values and depth values for a set of pixels in the image.

EXAMPLE 101

The system according to Example 100, wherein the computer processor unit is to segment the set of pixels into a set of segments and identify the set of objects in the image according to the set of segments.

EXAMPLE 102

The system according to Example 101, wherein to segment comprises identify the set of segments according to at least one of a threshold, a cluster, a compression algorithm, a histogram, an edge detection, a region-growth algorithm, a partial differential equation, a graph partition algorithm, a watershed transformation algorithm, a model-based segment algorithm, or a trainable segmentation algorithm.

EXAMPLE 103

The system according to Example 100, wherein the system comprises a depth sensor.

EXAMPLE 104

The system according to Example 103, wherein the depth sensor comprises at least one of a stereopsis sensor, a structured light source and sensor thereof, a time-of-flight sensor, and a coded aperture sensor.

EXAMPLE 105

The system according to Example 94, wherein to generate the unimpaired HBC object comprises to generate the unimpaired HBC object based on at least one of a corresponding mirror image unimpaired HBC relative to the absent or impaired HBC or a kinematic model of the unimpaired HBC object.

EXAMPLE 106

The system according to Example 94, wherein to generate the unimpaired HBC object comprises to determine a behavior of the unimpaired HBC object and determine the pose for the unimpaired HBC object in the 3D map over a time period according to the behavior.

EXAMPLE 107

The system according to Example 106, wherein the computer processor unit is to generate a cue for the behavior, wherein the cue comprises at least one of a visual or auditory indicator to a human to engage in the behavior.

EXAMPLE 108

The system according to Example 107, wherein the computer processor unit is further to output the cue.

EXAMPLE 109

The system according to Example 106, wherein the cue comprises at least one of a virtual object or an instruction to engage in the behavior with a corresponding mirror image unimpaired HBC relative to the absent or impaired HBC.

EXAMPLE 110

The system according to Example 106, wherein the behavior conforms to a kinematic chain for an unimpaired human body.

EXAMPLE 111

The system according to Example 94, further comprising a muscular-skeletal-nervous system sensor to determine a user input, wherein to determine the user input, the muscular-skeletal-nervous system sensor is to receive a signal from a human user and the computer processor unit is to interpret the signal as the user input according to a correspondence between the signal and an action of an unimpaired human body.

EXAMPLE 112

The system according to Example 111, wherein the correspondence is determined by at least one of a test of a signal to or from the absent or impaired HBC, a test of a corresponding signal to a corresponding mirror image unimpaired HBC relative to the absent or impaired HBC, or a retraining of the human user.

EXAMPLE 113

The system according to Example 111, wherein the muscular-skeletal-nervous system sensor comprises at least one of a muscle activity sensor, a nervous system activity sensor, a motor cortex sensor, or a sensory cortex sensor.

EXAMPLE 114

The system according to Example 111, wherein the computer processor unit is to determine the pose for the unimpaired HBC object in the 3D map over a time period according to the input.

EXAMPLE 115

The system according to Example 94, wherein the 3D space is defined relative to a perspective of the output device.

EXAMPLE 116

The system according to Example 94, wherein the computer processor unit is to generate the image of the unimpaired HBC object according to the 3D map and a perspective of the system.

The invention claimed is:

1. An apparatus for proprioception training, comprising:
    a computer processor and a memory; and
    a 3-dimensional ("3D") mapping module to prepare a 3D map of a scene, including to obtain at least an image of the scene, identify a set of objects in the image and their position in a 3D space, identify an absent or impaired human body component ("HBC") object in the set of objects, and prepare the 3D map of the scene comprising the set of objects in the 3D space;
    a 3D image generation module to place an unimpaired HBC object in the 3D map, including to determine the unimpaired HBC object, determine a pose for the unimpaired HBC object in the 3D map, and generate an image of the unimpaired HBC object at the determined pose;
    an output module to output the image of the unimpaired HBC object; and
    a hardware accelerator to accelerate performance of at least one of the modules, including to at least accelerate the identification of the set of objects in the 3D space.

2. The apparatus according to claim 1, wherein the output module is to output the image of the unimpaired HBC object in one of an augmented reality display and a virtual reality display, wherein the output module is to output the image of the unimpaired HBC object in the virtual reality display in conjunction with an output of an image of the 3D map and, wherein the output module is to output the image of the unimpaired HBC object in the augmented reality display as an overlay.

3. The apparatus according to claim 1, further comprising an image acquisition module to acquire the image of the scene, wherein to acquire the image of the scene, the image acquisition module is to image red, green and blue (RGB) values and depth values for a set of pixels in the image, wherein the 3D mapping module is to segment the set of pixels into a set of segments and identify the set of objects in the image according to the set of segments, wherein the apparatus comprises a depth sensor, and wherein the depth sensor comprises at least one of a stereopsis sensor, a structured light source and sensor thereof, a time-of-flight sensor, and a coded aperture sensor.

4. The apparatus according to claim 1, wherein either:
the image is a first image and wherein to prepare the 3D map of the scene, the 3D mapping module is further to instruct a human user to engage in a movement, receive the first and a second image, and compare at least a subset of the set of objects in the first and second images to a kinematic chain for an unimpaired human body and identify, in the comparison, the absent or impaired HBC object, or
to identify the absent or impaired HBC object in the set of objects further includes at least one of:
receive an identification of the absent or impaired HBC object, or compare at least a subset of the set of objects in the image to a kinematic chain for an unimpaired human body, and identify, by way of the comparison, the absent or impaired HBC object.

5. The apparatus according to claim 1, wherein either:
to generate the unimpaired HBC object includes to generate the unimpaired HBC object based on at least one of a corresponding mirror image unimpaired HBC relative to the absent or impaired HBC object or a kinematic model of the unimpaired HBC object,
or to generate the unimpaired HBC object includes to determine a behavior of the unimpaired HBC object and determine the pose for the unimpaired HBC object in the 3D map over a time period according to the behavior.

6. The apparatus according to claim 5, wherein the 3D image generation module is to generate a cue for the behavior, wherein the cue includes at least one of a virtual object or an instruction to engage in the behavior with a corresponding mirror image unimpaired HBC relative to the absent or impaired HBC object, and wherein the output module is further to output the cue.

7. The apparatus according to claim 1, further comprising a muscular- skeletal-nervous system sensor module to determine a user input, wherein to determine the user input, the muscular-skeletal-nervous system sensor module is to receive a signal from a human user and interpret the signal as the user input according to a correspondence between the signal and an action of an unimpaired human body;
wherein the correspondence is determined by at least one of a test of a signal to or from the absent or impaired HBC object, a test of a corresponding signal to a corresponding mirror image unimpaired HBC relative to the absent or impaired HBC object, or a retraining of the human user, and herein the 3D image generation module is further to determine the pose for the unimpaired HBC object in the 3D map over a time period according to the input.

8. A computer implemented method for proprioception therapy, comprising:
preparing a 3-dimensional ("3D") map of a scene by obtaining at least an image of the scene, identifying a set of objects in the image and their position in a 3D space, identifying an absent or impaired human body component ("HBC") object in the set of objects, and preparing the 3D map of the scene comprising the set of objects in the 3D space;
placing an unimpaired HBC object in the 3D map by determining the unimpaired HBC object to place, determining a pose for the unimpaired HBC object in the 3D map, and generating an image of the unimpaired HBC object at the determined pose; and
outputting the image of the unimpaired HBC object.

9. The method according to claim 8, wherein outputting the image of the unimpaired HBC object includes outputting to at least one of an augmented reality display or a virtual reality display;
wherein outputting the image of the unimpaired HBC object in the virtual reality display comprises outputting the image of the unimpaired HBC object in conjunction with outputting an image of the 3D map and wherein outputting the image of the unimpaired HBC object in the augmented reality display comprises outputting the image of the unimpaired HBC object as an overlay.

10. The method according to claim 8, further comprising acquiring the image of the scene by imaging RGB values and depth values for a set of pixels in the image and segmenting the set of pixels into a set of segments and identifying the set of objects in the image according to the set of segments.

11. The method according to claim 8, wherein either:
the image is a first image and wherein preparing the 3D map of the scene further includes instructing a human user to engage in a movement, receiving the first and a second image, and comparing at least a subset of the set of objects in the first and second images to a kinematic chain for an unimpaired human body and identifying, in the comparison, the absent or impaired HBC object,
or identifying the absent or impaired HBC object in the set of objects further includes at least one of receiving an identification of the absent or impaired HBC object or comparing at least a subset of the set of objects in the image to a kinematic chain for the unimpaired human body and identify, by way of the comparison, the absent or impaired HBC object.

12. The method according to claim 8, wherein, either:
generating the unimpaired HBC object comprises generating the unimpaired HBC object based on at least one of a corresponding mirror image unimpaired HBC relative to the absent or impaired HBC or a kinematic model of the unimpaired HBC object, or
generating the unimpaired HBC object comprises determining a behavior of the unimpaired HBC object and determining the pose for the unimpaired HBC object in the 3D map over a time period according to the behavior.

13. The method according to claim 12, further comprising generating and outputting a cue for the behavior, wherein the cue comprises at least one of a virtual object or an instruction to engage in the behavior with a corresponding mirror image unimpaired HBC relative to the absent or impaired HBC.

14. The method according to claim 8, further comprising receiving a signal from a muscular-skeletal-nervous system sensor and interpreting the signal as a user input according to a correspondence between the signal and an action of an unimpaired HBC;

wherein the correspondence is determined by at least one of a test of a signal to or from the absent or impaired HBC, a test of a corresponding signal to a corresponding mirror image unimpaired HBC relative to the absent or impaired HBC, or a retraining of a human user.

15. A computer apparatus for proprioception therapy, comprising:
   means to prepare a 3D map of a scene including means to obtain at least an image of the scene, identify a set of objects in the image and their position in a 3D space, identify an absent or impaired human body component ("HBC") object in the set of objects, and prepare the 3D map of the scene comprising the set of objects in the 3D space;
   means to place an unimpaired HBC object in the 3D map including means to determine the unimpaired HBC object, determine a pose for the unimpaired HBC object in the 3D map, and generate an image of the unimpaired HBC object at the determined pose; and
   means to output the image of the unimpaired HBC object.

16. The apparatus according to claim 15, further comprising means to output the image of the unimpaired HBC object in one of an augmented reality display and a virtual reality display,
   wherein means to output the image of the unimpaired HBC object in the augmented reality display includes means to output the image of the unimpaired HBC object in the augmented reality display as an overlay on a user's vision,
   and wherein means to output the image of the unimpaired HBC object in the virtual reality display includes means to output the image of the unimpaired HBC object in conjunction with an output of an image of the 3D map.

17. The apparatus according to claim 15, further comprising means to acquire the image of the scene comprising means to image RGB values and depth values for a set of pixels in the image and means to segment the set of pixels into a set of segments and means to identify the set of objects in the image according to the set of segments, wherein means to segment comprises means to identify the set of segments according to at least one of a threshold, a cluster, a compression algorithm, a histogram, an edge detection, a region-growth algorithm, a partial differential equation, a graph partition algorithm, a watershed transformation algorithm, a model-based segment algorithm, or a trainable segmentation algorithm.

18. The apparatus according to claim 15, wherein, either: the image is a first image and wherein means to prepare the 3D map of the scene further comprising means to instruct a human user to engage in a movement, means to receive the first and a second image, and means to compare at least a subset of the set of objects in the first and second images to a kinematic chain for an unimpaired human body and identify, in the comparison, the absent or impaired HBC object, or
   means to identify the absent or impaired HBC object in the set of objects further comprises means to receive an identification of the absent or impaired HBC object or means to compare at least a subset of the set of objects in the image to the kinematic chain for the unimpaired human body and means to identify, by way of the comparison, the absent or impaired HBC object.

19. The apparatus according to claim 15, wherein the means to generate the unimpaired HBC object includes means to generate the unimpaired HBC object based on at least one of a corresponding mirror image unimpaired HBC relative to the absent or impaired HBC or a kinematic model of the unimpaired HBC object,
   or the means to generate the unimpaired HBC object comprises means to determine a behavior of the unimpaired HBC object and determine the pose for the unimpaired HBC object in the 3D map over a time period according to the behavior.

20. The apparatus according to claim 19, further comprising means to generate and output a cue for the behavior, wherein the cue includes at least one of a virtual object or an instruction to engage in the behavior with a corresponding mirror image unimpaired HBC, relative to the absent or impaired HBC object.

21. The apparatus according to claim 15, further comprising:
   means to obtain a signal from a muscular-skeletal-nervous system sensor, and
   means to determine a user input in the signal according to a correspondence between the signal and an action of an unimpaired human body.

22. One or more non-transitory computer-readable media comprising instructions that cause a computer device, in response to execution of the instructions by a processor of the computer device, to:
   obtain an image of a scene, identify a set of objects in the image and their position in a 3D space, identify an absent or impaired human body component ("HBC") object in the set of objects, and prepare a 3D map of the scene comprising the set of objects in the 3D space;
   place an unimpaired HBC object in the 3D map, including to determine the unimpaired HBC object, determine a pose for the unimpaired HBC object and place the unimpaired HBC object in the 3D map, and generate an image of the unimpaired HBC object at the determined pose; and
   output the image of the unimpaired HBC object.

23. The non-transitory computer-readable media according to claim 22, wherein the computer device is further caused to output the image of the unimpaired HBC object in one of an augmented reality display as an overlay, or a virtual reality display in conjunction with an output of an image of the 3D map.

24. The non-transitory computer-readable media according to claim 22, wherein, when executed, the instructions further cause the computer device to segment a set of pixels into a set of segments and identify the set of objects in the image according to the set of segments.

25. The non-transitory computer-readable media according to claim 22, wherein the image is a first image and wherein, when executed, the instructions further cause the computer device to:
   instruct a human user to engage in a movement,
   receive the first and a second image, and
   compare at least a subset of the set of objects in the first and second images to a kinematic chain for an unimpaired human body and identify, in the comparison, the absent or impaired HBC object.

* * * * *